United States Patent
Iida

(10) Patent No.: US 8,036,320 B2
(45) Date of Patent: Oct. 11, 2011

(54) PULSE RECEIVING CIRCUIT, PULSE RECEIVING METHOD AND PULSE WIRELESS COMMUNICATION DEVICE

(75) Inventor: Izumi Iida, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 662 days.

(21) Appl. No.: 12/191,240

(22) Filed: Aug. 13, 2008

(65) Prior Publication Data

US 2009/0052586 A1 Feb. 26, 2009

(30) Foreign Application Priority Data

Aug. 20, 2007 (JP) ................... 2007-213365

(51) Int. Cl.
*H04L 27/06* (2006.01)
(52) U.S. Cl. ........................................... 375/340
(58) Field of Classification Search .................. 375/130, 375/238–239, 259, 316, 340, 346; 370/212, 370/213; 329/312–313
See application file for complete search history.

(56) References Cited

U.S. PATENT DOCUMENTS

| | | | | |
|---|---|---|---|---|
| 6,426,716 | B1 * | 7/2002 | McEwan | 342/28 |
| 6,980,613 | B2 * | 12/2005 | Krivokapic | 375/346 |
| 7,764,756 | B2 * | 7/2010 | Yu et al. | 375/354 |
| 7,907,005 | B2 * | 3/2011 | Kranabenter | 329/311 |
| 2002/0175850 | A1 * | 11/2002 | Barnes et al. | 342/22 |
| 2005/0213635 | A1 * | 9/2005 | Terada et al. | 375/130 |

FOREIGN PATENT DOCUMENTS

| | | |
|---|---|---|
| JP | 2003-110466 | 4/2003 |
| JP | 2005-039526 | 2/2005 |
| JP | 2005-252740 | 9/2005 |

* cited by examiner

*Primary Examiner* — Khanh C Tran
(74) *Attorney, Agent, or Firm* — Kilpatrick Townsend & Stockton LLP

(57) ABSTRACT

A pulse receiving circuit which receives a receiving signal from the outside includes: a template pulse generating circuit which generates a first pulse signal and a second pulse signal having phase different from that of the first pulse signal based on a pulse position timing signal; a first multiplying circuit which multiplies the receiving signal by the first pulse signal and outputs a first multiplication signal; a second multiplying circuit which multiplies the receiving signal by the second pulse signal and outputs a second multiplication signal; a first low band pass filtering circuit which extracts low frequency component from frequency components of the first multiplication signal and outputs a first low frequency signal; a second low band pass filtering circuit which extracts low frequency component from frequency components of the second multiplication signal and outputs a second low frequency signal; and an envelope detection circuit which performs envelope calculation by using the first low frequency signal and the second low frequency signal and outputs a detection signal.

20 Claims, 16 Drawing Sheets

PULSE RECEIVING CIRCUIT, PULSE RECEIVING METHOD AND PULSE WIRELESS COMMUNICATION DEVICE

This application claims priority to Japanese Patent Application No. 2007-213365, filed Aug. 20, 2007, the disclosure of which is incorporated by reference herein, in its entirety and for all purposes.

BACKGROUND OF THE INVENTION

1. Field of Invention

The present invention relates to a pulse receiving circuit and a pulse wireless communication device using ultra-wide band.

2. Related Art

Ultra-wide band (UWB) communication is a communication system which provides data communication by using extremely wide frequency band. Examples of the communication system using UWB signals in a wide band include spectrum diffusion method, orthogonal frequency division multiplex (OFDM), and other known methods, and further include impulse radio (IR) system which uses pulses having extremely short periods. The IR system used in the UWB communication is particularly called UWB-IR. According to the UWB-IR system, modulation and demodulation can be performed not by conventional modulation method but only by time base operation, and improvement over simplification of circuit and reduction of power consumption is expected.

In the pulse communication having large occupation frequency band width, however, the communication is affected by the presence of extremely strong interference signals having narrow band.

For example, according to a pulse receiving device using envelope detection such as rectification detection proposed in JP-A-2005-252740, the structure for achieving rectification detection has a simple circuit and performs low power consumption operation. However, this structure detects all frequency components and therefore requires band pass filter for removing interference signals. In this case, the cost and size increase. The technology disclosed in JP-A-2003-110466 is a method for reducing the effect of interference signals by using diffusion codes instead of the band pass filter. However, pulses having a rate higher than necessary bit rate need to be generated so as to provide the necessary bit rate. In this case, power consumption increases. Furthermore, when a process for removing interference signals is executed by inverse diffusion method in a digitized manner, a multi-bit AD converter needs to be provided to cope with large interference signals. In this case, circuit scale and power consumption increase.

JP-A-2005-39526 discloses a method for executing synchronous detection by using correlation with receiving pulse waveforms.

According to this method, interference waves other than desired pulses can be removed by performing correlation calculation without the need for providing band pass filter. However, highly accurate timing process is required at the time of execution of correlation calculation. For satisfying this requirement, clock source having high accuracy and low jitter is needed. Moreover, a complicated pulse position synchronous circuit is required, which increases power consumption.

SUMMARY

It is an advantage of some aspects of the invention to provide a pulse receiving circuit and a pulse wireless communication device capable of solving at least a part of the problems described above, and having the following structures shown as examples.

A pulse receiving circuit which receives a receiving signal from the outside according to a first aspect of the invention includes: a template pulse generating circuit which generates a first pulse signal and a second pulse signal having phase different from that of the first pulse signal based on a pulse position timing signal; a first multiplying circuit which multiplies the receiving signal by the first pulse signal and outputs a first multiplication signal; a second multiplying circuit which multiplies the receiving signal by the second pulse signal and outputs a second multiplication signal; a first low band pass filtering circuit which extracts low frequency component from frequency components of the first multiplication signal and outputs a first low frequency signal; a second low band pass filtering circuit which extracts low frequency component from frequency components of the second multiplication signal and outputs a second low frequency signal; and an envelope detection circuit which performs envelope calculation by using the first low frequency signal and the second low frequency signal and outputs a detection signal.

According to this structure, wave detection can be performed with reduced effect of interference signals without requiring high-accuracy and low-jitter clock source by combining two pulse signals having different phases.

It is preferable that the phase difference between the first pulse signal and the second pulse signal is approximately 90 degrees.

According to this structure, envelope detection can be performed with the highest efficiency by combining a first pulse signal (I-phase) and a second pulse signal (Q-phase) having a phase difference of 90 degrees. Thus, wave detection can be performed with reduced effect of interference signals without requiring high-accuracy and low-jitter clock source.

It is preferable that the envelope detection circuit contains a half-wave rectifying circuit.

It is preferable that the envelope detection circuit contains a full-wave rectifying circuit.

It is preferable that the envelope detection circuit contains a square circuit.

According to these structures, wave detection can be performed with resistance to interference signals without requiring high-accuracy and low-jitter clock source.

It is preferable that template pulse generating circuit includes: a first pulse generating circuit and a second pulse generating circuit, each of which contains a first pin, a second pin, n (n: two or larger integer) delay elements connected in series with the first pin, and a logic circuit outputting a pulse signal through the second pin based on a signal inputted through the first pin and n output signals outputted from the n delay elements; a timing input pin through which the pulse position timing signal is inputted; a first delay element; and a second delay element having longer delay time than that of the first delay element. The input pins of the first delay element and second delay element are connected with the timing input pin. The output pin of the first delay element is connected with the first pin of the first pulse generating circuit to output the first pulse signal through the second pin of the first pulse generating circuit. The output pin of the second delay element is connected with the first pin of the second pulse generating circuit to output the second pulse signal through the second pin of the second pulse generating circuit.

According to this structure, two pulse signals having different phases can be outputted with reduced circuit scale and power consumption.

It is preferable that the template pulse generating circuit includes: a timing input pin through which the pulse position timing signal is inputted; a multi-phase oscillating circuit which generates the first pulse signal and the second pulse signal; and an ON-OFF control circuit connected between the input pin and the multi-phase oscillating circuit to output an ON-OFF signal which is turned on when the pulse position timing signal is turned on, and turned off after a time period longer than a pulse width of the receiving signal elapses from the time when the ON-OFF signal is turned on. The multi-phase oscillating circuit generates the first pulse signal and the second pulse signal based on the ON-OFF control signal.

According to this structure, the first pulse signal (I-phase) and the second pulse signal (Q-phase) having phase difference of 90 degrees can be accurately produced.

It is preferable that the template pulse generating circuit includes: a first frequency control pulse generating circuit and a second frequency control pulse generating circuit, each of which contains a first pin, a second pin, n (n: two or larger integer) delay control elements connected in series with the first pin and capable of controlling delay time based on a frequency control signal, and a logic circuit outputting a pulse signal through the second pin based on a signal inputted through the first pin and n output signals outputted from the n delay elements; a timing input pin through which the pulse position timing signal is inputted; a first delay element; a second delay element having longer delay time than that of the first delay element; and a frequency control circuit which outputs the frequency control signal. Input pins of the first delay element and the second delay element are connected with the timing input pin. The output pin of the first delay element are connected with the first pin of the first frequency control pulse generating circuit to output the first pulse signal through the second pin of the first frequency control pulse generating circuit. The output pin of the second delay element are connected with the first pin of the second frequency control pulse generating circuit to output the second pulse signal through the second pin of the second frequency control pulse generating circuit.

According to this structure, both frequency control and reduction of circuit scale and power consumption can be achieved by using a simple frequency control circuit.

It is preferable that the template pulse generating circuit includes: a timing input pin through which the pulse position timing signal is inputted; a frequency control multi-phase oscillating circuit which controls frequency of an oscillation signal based on a frequency control signal for generating the first pulse signal and the second pulse signal; an ON-OFF control circuit connected between the input pin and the frequency control multi-phase oscillating circuit to output an ON-OFF signal which is turned on when the pulse position timing signal is turned on, and turned off after a time period longer than a pulse width of the receiving signal elapses from the time when the ON-OFF signal is turned on; and a frequency control circuit which generates the frequency control signal based on the oscillation signal.

According to this structure, the frequency control signal is controlled based on the oscillation signal from the frequency control multi-phase oscillating circuit. Thus, accurate frequency control can be achieved.

It is preferable that the template pulse generating circuit includes: a first frequency control pulse generating circuit and a second frequency control pulse generating circuit, each of which contains a first pin, a second pin, n (n: two or larger integer) delay control elements connected in series with the first pin and capable of controlling delay time based on a frequency control signal, and a logic circuit outputting a pulse signal through the second pin based on a signal inputted through the first pin and n output signals outputted from the n delay elements; a frequency control circuit which contains a ring oscillating circuit having m (m: 2 or larger integer) delay control elements having delay characteristics substantially equivalent or proportional to those of the delay control elements and outputs the frequency control signal based on an output signal from the ring oscillating circuit; a timing input pin through which the pulse position timing signal is inputted; a first delay element; a second delay element having longer delay time than that of the first delay element; and input pins of the first delay element and the second delay element being connected with the timing input pin. The output pin of the first delay element is connected with the first pin of the first frequency control pulse generating circuit to output the first pulse signal through the second pin of the first frequency control pulse generating circuit. The output pin of the second delay element is connected with the first pin of the second frequency control pulse generating circuit to output the second pulse signal through the second pin of the second frequency control pulse generating circuit.

According to this structure, the frequency control signal is controlled based on the oscillation cycle of the ring oscillating circuit having the delay control elements approximately equivalent or proportional to those contained in the first and second frequency control pulse generating circuits. Thus, both almost accurate frequency control and reduction of circuit scale and power consumption can be achieved.

It is preferable that the template pulse generating circuit includes: a first frequency control pulse generating circuit and a second frequency control pulse generating circuit, each of which contains a first pin, a second pin, n (n: two or larger integer) delay control elements connected in series with the first pin and capable of controlling delay time based on a frequency control signal, and a logic circuit outputting a pulse signal through the second pin based on a signal inputted through the first pin and n output signals outputted from the n delay elements; a frequency control circuit which contains a ring oscillating circuit having m (m: 2 or larger integer) delay control elements having delay characteristics substantially equivalent or proportional to those of the delay control elements, a counter circuit which counts an output signal from the ring oscillating circuit and outputs a count value, and a ROM table which stores the value of the frequency control signal corresponding to the count value; a timing input pin through which the pulse position timing signal is inputted; a first delay element; a second delay element having longer delay time than that of the first delay element; and input pins of the first delay element and the second delay element being connected with the timing input pin. The output pin of the first delay element is connected with the first pin of the first frequency control pulse generating circuit to output the first pulse signal through the second pin of the first frequency control pulse generating circuit. The output pin of the second delay element is connected with the first pin of the second frequency control pulse generating circuit to output the second pulse signal through the second pin of the second frequency control pulse generating circuit.

According to this structure, frequency control is performed by referring to the ROM table corresponding to the count value of the ring oscillating circuit. Thus, increase in frequency control speed, simplification of circuit, and reduction of power consumption can be achieved.

A pulse receiving circuit according to a second aspect of the invention includes: a first pulse receiving circuit which is the pulse receiving circuit described above; a second pulse receiving circuit which contains a half-wave rectifying detection circuit; and a communication path quality judging circuit which judges quality of a communication path. The receiving signal is inputted to the first pulse receiving circuit to output the detection signal when the quality of the communication path is lower than predetermined quality. The receiving signal is inputted to the second pulse receiving circuit to output the detection signal when the quality of the communication path is higher than the predetermined quality.

According to this structure, the second pulse receiving circuit having a small circuit structure is selected when the communication path quality is preferable. Thus, power consumption can be reduced.

A pulse receiving circuit according to a third aspect of the invention includes: a first pulse receiving circuit which is the pulse receiving circuit described above; a second pulse receiving circuit which contains a full-wave rectifying detection circuit; and a communication path quality judging circuit which judges quality of a communication path. The receiving signal is inputted to the first pulse receiving circuit to output the detection signal when the quality of the communication path is lower than predetermined quality. The receiving signal is inputted to the second pulse receiving circuit to output the detection signal when the quality of the communication path is higher than the predetermined quality.

According to this structure, the second pulse receiving circuit having a small circuit structure is selected when the communication path quality is preferable. Thus, power consumption can be reduced.

A pulse receiving circuit according to a fourth aspect of the invention includes: a first pulse receiving circuit which is the pulse receiving circuit described above; a second pulse receiving circuit which contains a square detection circuit; and a communication path quality judging circuit which judges quality of a communication path. The receiving signal is inputted to the first pulse receiving circuit to output the detection signal from the first pulse receiving circuit when the quality of the communication path is lower than predetermined quality. The receiving signal is inputted to the second pulse receiving circuit to output the detection signal from the second pulse receiving circuit when the quality of the communication path is higher than the predetermined quality.

According to this structure, the second pulse receiving circuit having a small circuit structure is selected when the communication path quality is preferable. Thus, power consumption can be reduced.

A pulse receiving circuit according to a fifth aspect of the invention includes: a first pulse receiving circuit which is the pulse receiving circuit described above; a second pulse receiving circuit which is a synchronous detection circuit; and a communication path quality judging circuit which judges quality of a communication path. The receiving signal is inputted to the second pulse receiving circuit to output the detection signal from the second pulse receiving circuit when the quality of the communication path is lower than predetermined quality. The receiving signal is inputted to the first pulse receiving circuit to output the detection signal from the first pulse receiving circuit when the quality of the communication path is higher than the predetermined quality.

According to this structure, the second pulse generating circuit having high performance is selected when the communication path quality is low due to presence of interference signals. Thus, improvement of resistance to interference signals and reduction of power consumption are achieved.

A pulse receiving circuit according to a sixth aspect of the invention includes: a first pulse receiving circuit which is the pulse receiving circuit described above; a second pulse receiving circuit which is a synchronous detection circuit; a communication path quality judging circuit which judges quality of a communication path; and a phase control circuit which outputs the pulse position timing signal based on a clock signal. The clock signal is produced by a resonance oscillator and the receiving signal is inputted to the second pulse receiving circuit to output the detection signal from the second pulse receiving circuit when the quality of the communication path is lower than predetermined quality. The clock signal is produced by a ring oscillator and the receiving signal is inputted to the first pulse receiving circuit to output the detection signal from the first pulse receiving circuit when the quality of the communication path is higher than the predetermined quality.

According to this structure, the second pulse receiving circuit having high performance and the low-jitter resonance oscillator are selected when the communication path quality is low due to presence of interference signals. Thus, improvement of resistance to interference signals and reduction of power consumption are achieved.

A pulse receiving circuit according to a seventh aspect of the invention includes: a first pulse receiving circuit which is the pulse receiving circuit described above; a second pulse receiving circuit which is a synchronous detection circuit; a third pulse receiving circuit as an envelope detection circuit; and a communication path quality judging circuit which judges quality of a communication path. The receiving signal is inputted to the second pulse receiving circuit to output the detection signal from the second pulse receiving circuit when the quality of the communication path is lower than first quality as predetermined quality. The receiving signal is inputted to the first pulse receiving circuit to output the detection signal from the first pulse receiving circuit when the quality of the communication path lies within the range between the first quality and second quality higher than the first quality. The receiving signal is inputted to the third pulse receiving circuit to output the detection signal from the third pulse receiving circuit when the quality of the communication path is higher than the second quality.

According to this structure, the optimum pulse receiving circuit is selected according to the communication path quality. Thus, improvement of resistance to interference signals and reduction of power consumption are achieved.

A pulse receiving circuit according to an eighth aspect of the invention includes: a first pulse receiving circuit which is the pulse receiving circuit described above; a second pulse receiving circuit which is a synchronous detection circuit; a variable ring oscillating circuit which has p+q (p,q: arbitrary natural numbers) delay elements and switches between ring oscillation using the p delay elements and ring oscillation using the p+q delay elements; and a phase control circuit which outputs the pulse position timing signal based on a clock signal. The ring oscillation of the variable ring oscillating circuit using the p delay elements is selected and the receiving signal is inputted to the second pulse receiving circuit to output the detection signal from the second pulse receiving circuit when generation of the receiving signal is more frequent than a predetermined value. The ring oscillation of the variable ring oscillating circuit using the p+q delay elements is selected and the receiving signal is inputted to the first pulse receiving circuit to output the detection signal from the first pulse receiving circuit when generation of the receiving signal is more frequent than a predetermined value.

According to this structure, the synchronous detection circuit having high resistance to interference is selected when the communication speed is high. Thus, improvement of resistance to interference signals and reduction of power consumption are achieved.

A pulse wireless communication device according to a ninth aspect of the invention includes: the pulse receiving circuit described above; and a pulse transmitting circuit.

According to this structure, communication not easily affected by interference signals can be achieved with reduced circuit scale and power consumption without requiring high-accuracy and low-jitter clock source.

BRIEF DESCRIPTION OF THE DRAWINGS

The invention will be described with reference to the accompanying drawings, wherein like numbers reference like elements.

DESCRIPTION OF THE EXEMPLARY EMBODIMENTS

A pulse receiving circuit as an example of the invention is hereinafter described with reference to the drawings.

First Embodiment

Structure of Pulse Receiving Circuit

Figure 1A:
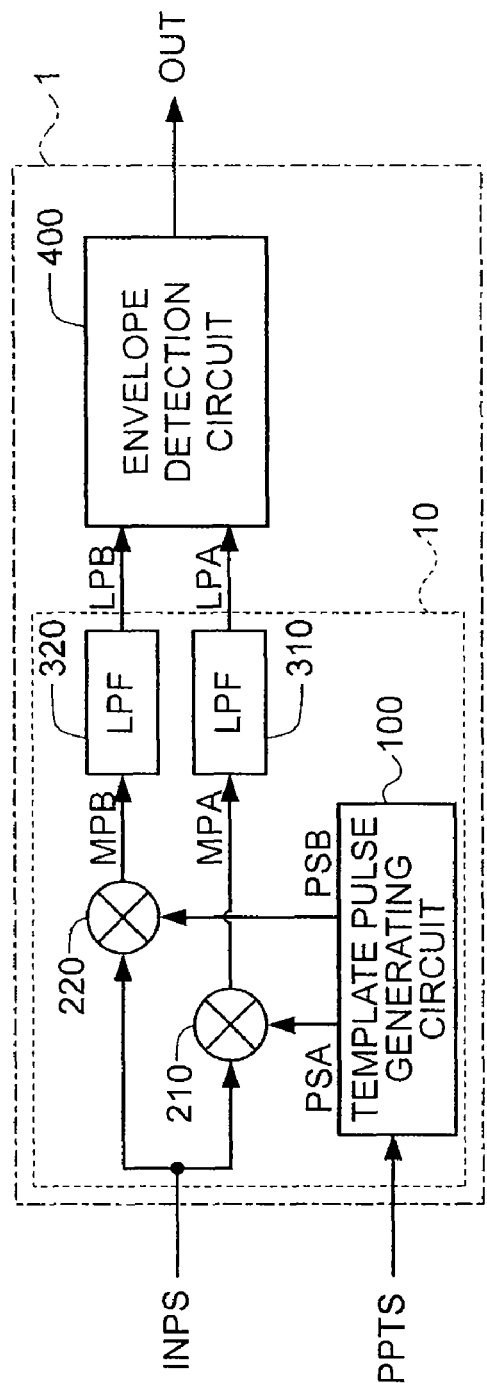
FIG. 1A is a block diagram showing a structure of a pulse receiving circuit according to a first embodiment.
Figure 1B:
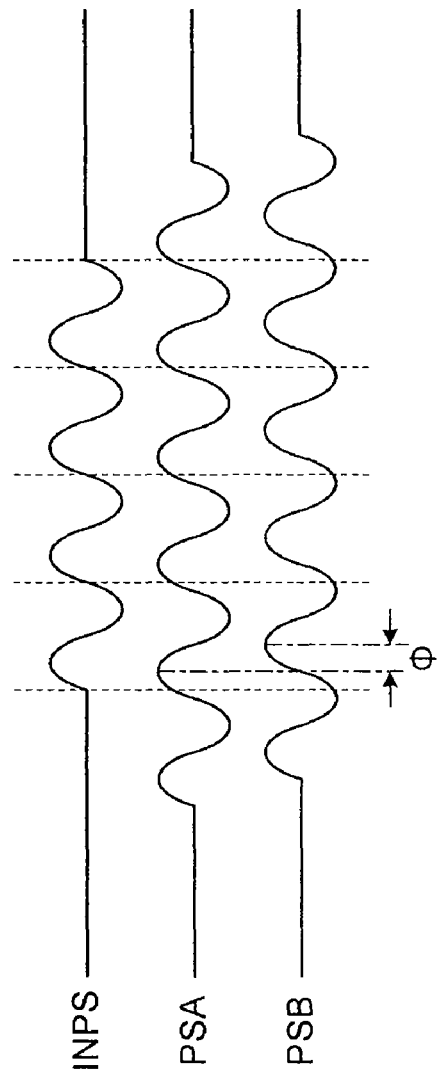
FIG. 1B is a timing chart showing operation of the pulse receiving circuit according to the first embodiment.

A structure of a pulse receiving circuit according to a first embodiment is now described with reference to FIGS. 1A and 1B. FIG. 1A is a block diagram showing the structure of the pulse receiving circuit according to the first embodiment. FIG. 1B is a timing chart showing operation of the pulse receiving circuit according to the first embodiment.

As illustrated in FIG. 1A, a pulse receiving circuit 1 includes a signal processing circuit 10 having a template pulse generating circuit 100, a multiplying circuit 210 as a first multiplying circuit, a multiplying circuit 220 as a second multiplying circuit, an LPF (low pass filter) 310 as a first low band pass filtering circuit, and an LPF 320 as a second low band pass filtering circuit. The pulse receiving circuit 1 also includes an envelope detection circuit 400.

The template pulse generating circuit 100 generates a pulse signal PSA as a first pulse signal and a pulse signal PSB as a second pulse signal having phases different from each other based on a pulse position timing signal PPTS. The multiplying circuit 210 outputs a multiplication signal MPA as a first multiplying signal showing the product of a receiving signal INPS received from the outside and the pulse signal PSA. The multiplying circuit 220 outputs a multiplying signal MPB as a second multiplying signal showing the product of the receiving signal INPS and the pulse signal PSB. The LPF 310 extracts low frequency component from the multiplication signal MPA and outputs a low frequency signal LPA as a first low frequency signal. The LPF 320 extracts low frequency component from the multiplication signal MPB and outputs a low frequency signal LPB as a second low frequency signal. The envelope detection circuit 400 outputs a detection signal OUT based on the low frequency signals LPA and LPB.

As shown in FIG. 1B, the pulse signal PSA is produced prior to the receiving signal INPS, and the width of the pulse signal PSA is larger than that of the receiving signal INPS. The pulse signal PSB is produced after the pulse signal PSA with delay corresponding to a phase difference Φ. For detecting the detection signal OUT from the receiving signal INPS with the highest efficiency, it is preferable that the pulse signal PSA and the pulse signal PSB are orthogonal to each other, that is, the phase difference Φ is 90 degrees. In case of the phase difference Φ of 90 degrees, the pulse signal PSA has I phase (in phase), and the pulse signal PSB has Q phase (quadrature phase). However, a phase compensating circuit is needed to obtain accurate orthogonality between the pulse signal PSA and the pulse signal PSB, which increases circuit scale and power consumption. When the phase difference Φ is deviated from orthogonality, the detection results of the I phase component and the Q phase component are unbalanced. In this case, the SNR (S/N ratio) of the detection signal OUT deteriorates. According to the pulse communication, however, the SNR of the receiving signal INPS is sufficiently large, which eliminates the necessity for phase compensation in most cases.

Structure of Envelope Detection Circuit

Figure 2A:
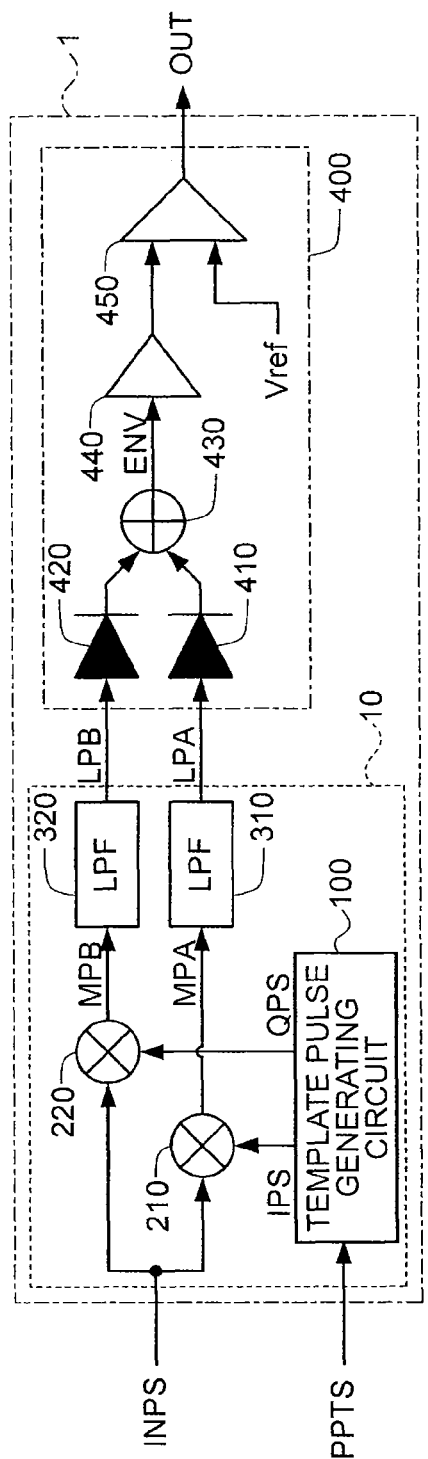
FIG. 2A is a circuit diagram showing a structure which includes an envelope detection circuit having half-wave rectifying circuits.
Figure 2B:
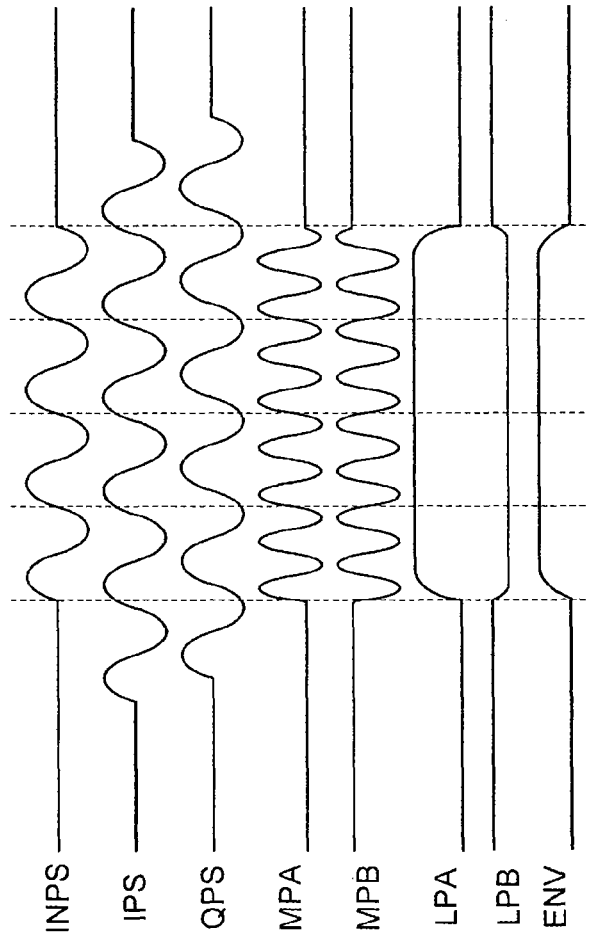
FIG. 2B is a timing chart showing operation of the envelope detection circuit.

The envelope detection circuit containing half-wave rectifying circuits is now described with reference to FIGS. 2A and 2B. FIG. 2A is a circuit diagram showing a structure which includes the envelope detection circuit containing half-wave rectifying circuits. FIG. 2B is a timing chart showing operation of the envelope detection circuit. As illustrated in FIG. 2A, the template pulse generating circuit 100 outputs an I-phase pulse signal IPS as the pulse signal PSA, and a Q-phase pulse signal QPS as the pulse signal PSB.

As illustrated in FIG. 2A, the envelope detection circuit 400 includes diodes 410 and 420 as half-wave rectifying circuits, an adding circuit 430, an amplifier 440, and a comparator 450. The adding circuit 430 outputs an envelope signal ENV as the sum of a signal obtained after half-wave rectification of the low frequency signal LPA by the diode 410 and a signal obtained after half-wave rectification of low frequency signal LPB by the diode 420. The envelope signal ENV is amplified by the amplifier 440, and the voltage difference from a reference voltage Vref is amplified by the comparator 450. Then, the resultant signal is outputted as the detection signal OUT. The respective signals generated in the pulse receiving circuit 1 operate in the manner shown in FIG. 2B.

Figure 3:
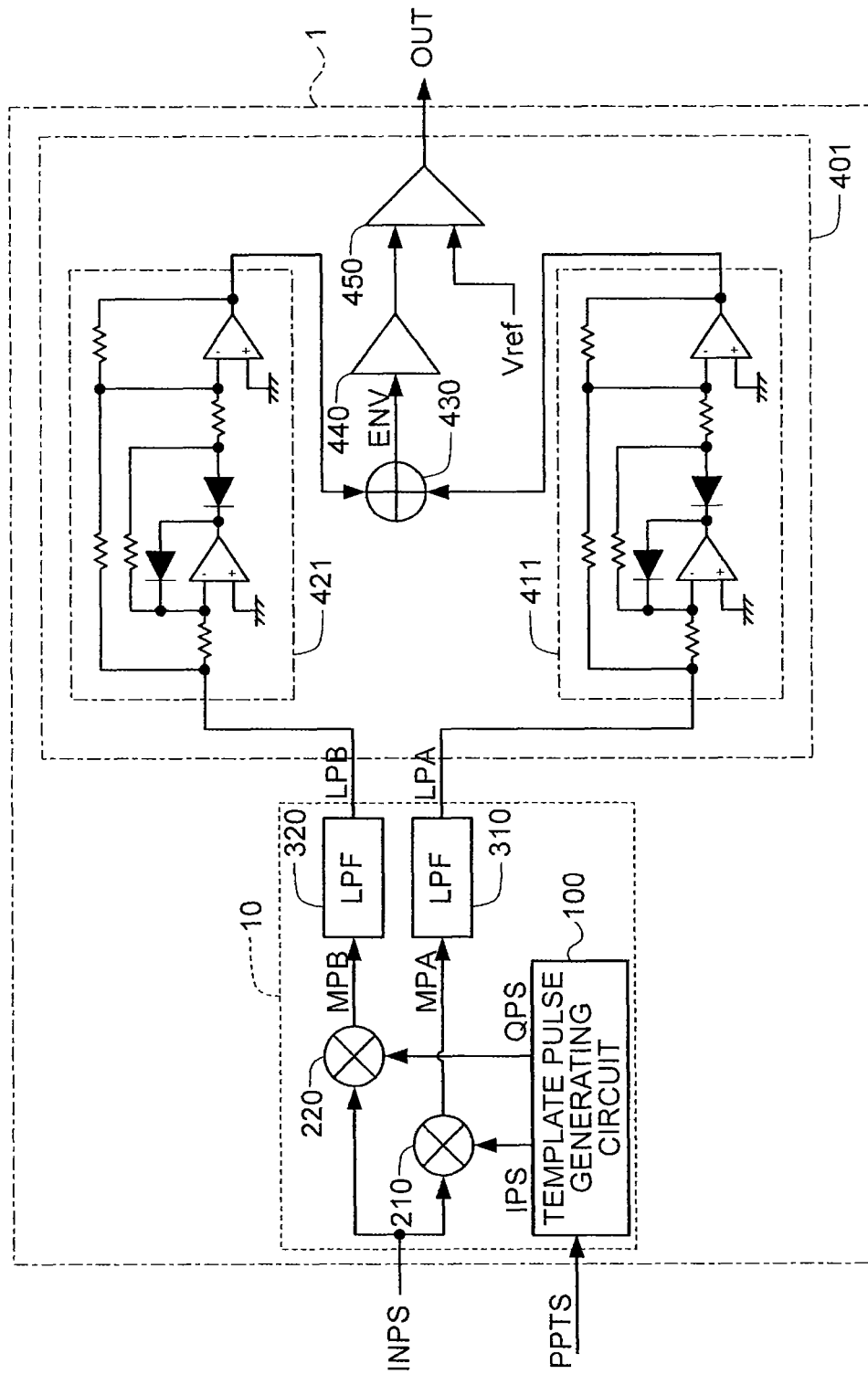
FIG. 3 is a circuit diagram showing a structure which includes an envelope detection circuit having full-wave rectifying circuits.

The envelope detection circuit containing full-wave rectifying circuits is now described with reference to FIG. 3. FIG. 3 is a circuit diagram showing a structure which includes the envelope detection circuit containing full-wave rectifying circuits. The template pulse generating circuit 100 outputs the I-phase pulse signal IPS as the pulse signal PSA, and the Q-phase pulse signal QPS as the pulse signal PSB as shown in FIG. 3.

As can be seen from FIG. 3, an envelope detection circuit 401 includes full-wave rectifying circuits 411 and 421, the adding circuit 430, the amplifier 440, and the comparator 450. The adding circuit 430 outputs the envelope signal ENV as the sum of a signal obtained after full-wave rectification of the low frequency signal LPA by the full-wave rectifying circuit 411 and a signal obtained after full-wave rectification of low frequency signal LPB by the full-wave rectifying circuit 421. The envelope signal ENV is amplified by the amplifier 440, and the voltage difference from a reference voltage Vref is amplified by the comparator 450. Then, the resultant signal is outputted as the detection signal OUT.

Figure 4:
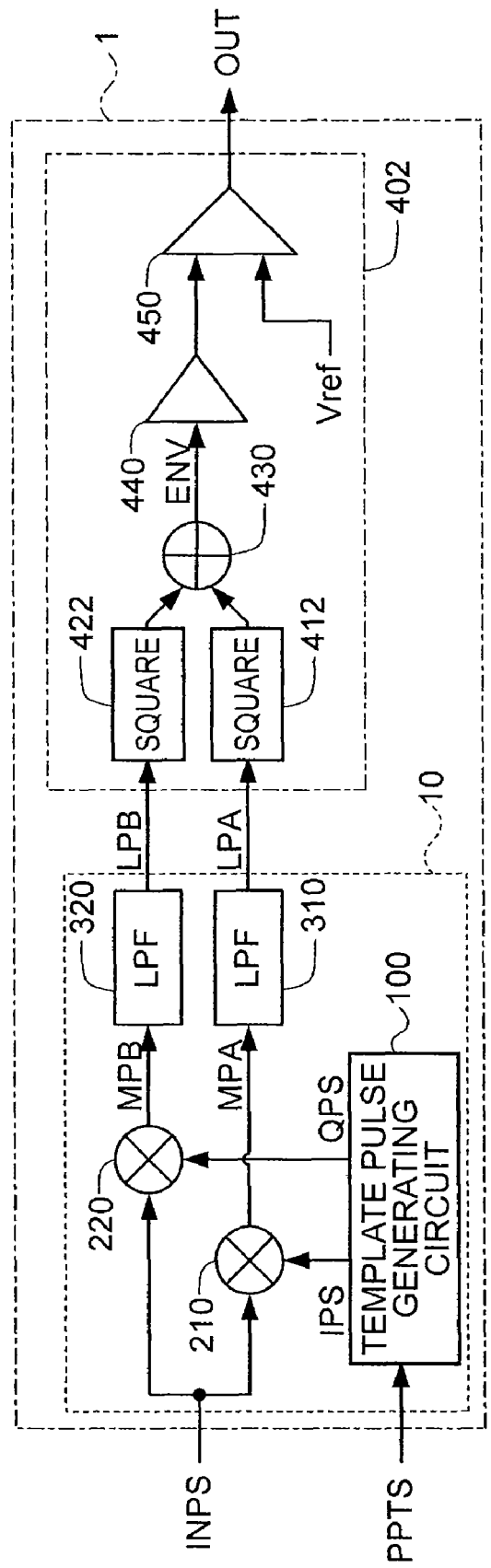
FIG. 4 is a circuit diagram showing a structure which includes an envelope detection circuit having square circuits.

The envelope detection circuit containing square circuits is now described with reference to FIG. 4. FIG. 4 is a circuit diagram showing a structure which includes the envelope detection circuit containing square circuits. The template pulse generating circuit 100 outputs the I-phase pulse signal IPS as the pulse signal PSA, and the Q-phase pulse signal QPS as the pulse signal PSB as shown in FIG. 4.

As can be seen from FIG. 4, an envelope detection circuit 402 includes square circuits 412 and 422, the adding circuit 430, the amplifier 440, and the comparator 450. The adding circuit 430 outputs the envelope signal ENV as the sum of a signal obtained after square of the low frequency signal LPA by the square circuit 412 and a signal obtained after square of low frequency signal LPB by the square circuit 422. The envelope signal ENV is amplified by the amplifier 440, and the voltage difference from a reference voltage Vref is amplified by the comparator 450. Then, the resultant signal is outputted as the detection signal OUT.

Differences between the respective detection methods are now described with reference to FIGS. 5A through 5C.

Figure 5A:
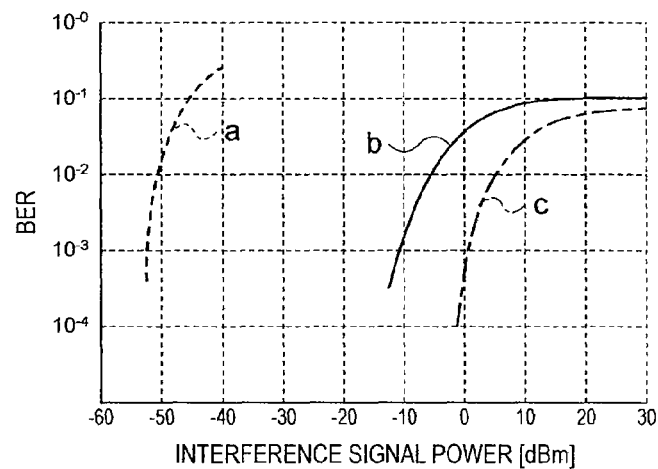
FIG. 5A is a graph showing interference signal power and BER characteristics provided by different detection systems.

FIG. 5A is a graph showing relationship between interference signal power and BER (bit error rate) characteristics due to a difference in the detection method. In FIG. 5A, graph a indicates the full-wave rectifying detection method, graph b indicates the detection method proposed in FIG. 4 (hereinafter referred to as $I^2+Q^2$ detection method), and graph c indicates a synchronous detection method. A band pass filter (BPF) is not used in all of the methods. As can be seen from FIG. 5A, the resistance to interference in the $I^2+Q^2$ detection method (graph b) is inferior to that of the synchronous detection method (graph c), but superior to that of the full-wave rectifying detection method (graph a).

Figure 5B:
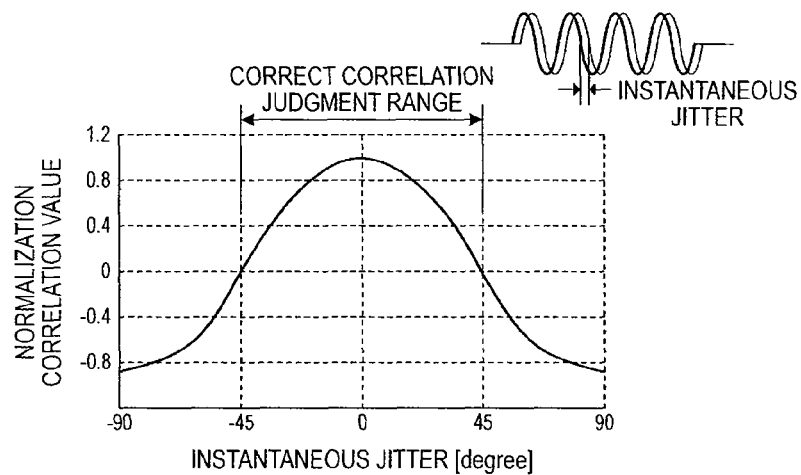
FIG. 5B is a graph showing effect of instantaneous jitter in synchronous detection system.

FIG. 5B is a graph indicating the effect of instantaneous jitter in the synchronous detection method, showing variations in the correlation calculation results according to the phase difference between the receiving pulse and the correlation template pulse in an example where four sine waves are contained in one pulse of the receiving signal INPS. As can be seen from FIG. 5B, the signs of normalization correlation values are inversed when the instantaneous jitter exceeds about ±45 degrees. As a result, bit error is produced. Thus, a value σ of the instantaneous jitter needs to be smaller than 19.3 degrees for satisfying BER=$10^{-3}$, for example. When the frequency of sine waves contained in one pulse is 4 GHz, for example, the value of 19.3 degrees corresponds to 13.4 ps. In this case, the value σ of the instantaneous jitter of a cyclic signal for generating the pulse needs to be 13.4 ps or smaller. When both the transmitting device and the receiving device use the cyclic signals having the same jitter quality, the jitter value 6 necessary for one of these devices decreases to 9.5 ps.

When the generation cycle (bit rate) of pulses is 1 MHz, for example, it is extremely difficult to achieve required instantaneous jitter performance by a system having small circuit area and small power consumption such as a ring oscillator. Thus, the jitter characteristics need to be satisfied by using crystal oscillator, SAW oscillator, LC oscillator or other resonance oscillating circuits. In this case, power consumption and mounting area increase. In the $I^2+Q^2$ detection method, presence or absence of pulse signals can be detected even when phases of the receiving pulse and the template pulse do not coincide each other. In this case, substantially no effect is given from the instantaneous jitter.

Figure 5C:
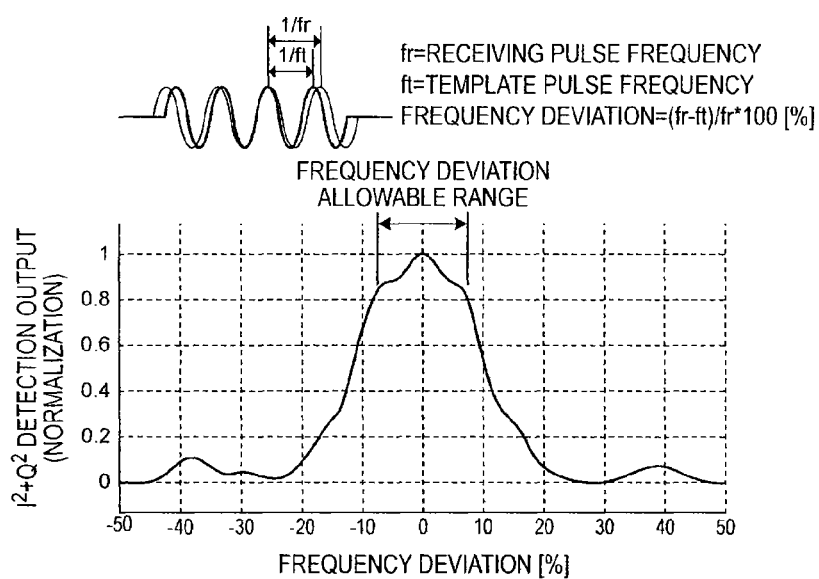
FIG. 5C is a graph showing relationship between deviation of a receiving pulse from center frequency of a template pulse and $I^2+Q^2$ detection output in $I^2+Q^2$ detection method.

FIG. 5C is a graph showing the relationship between deviation of the receiving pulse from the center frequency of the template pulse and $I^2+Q^2$ detection output in the $I^2+Q^2$ detection method. As can be seen from FIG. 5C, the allowable values of the center frequency deviation are within the range of about ±8%. The typical required value of the oscillation frequency accuracy in the ordinary wireless communication is about 100 ppm or lower. However, the center frequency accuracy in the $I^2+Q^2$ detection method may be extremely low. In this case, both simplification of the circuit for controlling the frequency and reduction of power consumption of the oscillating circuit can be achieved.

Structure of Template Pulse Generating Circuit

Figure 6A:
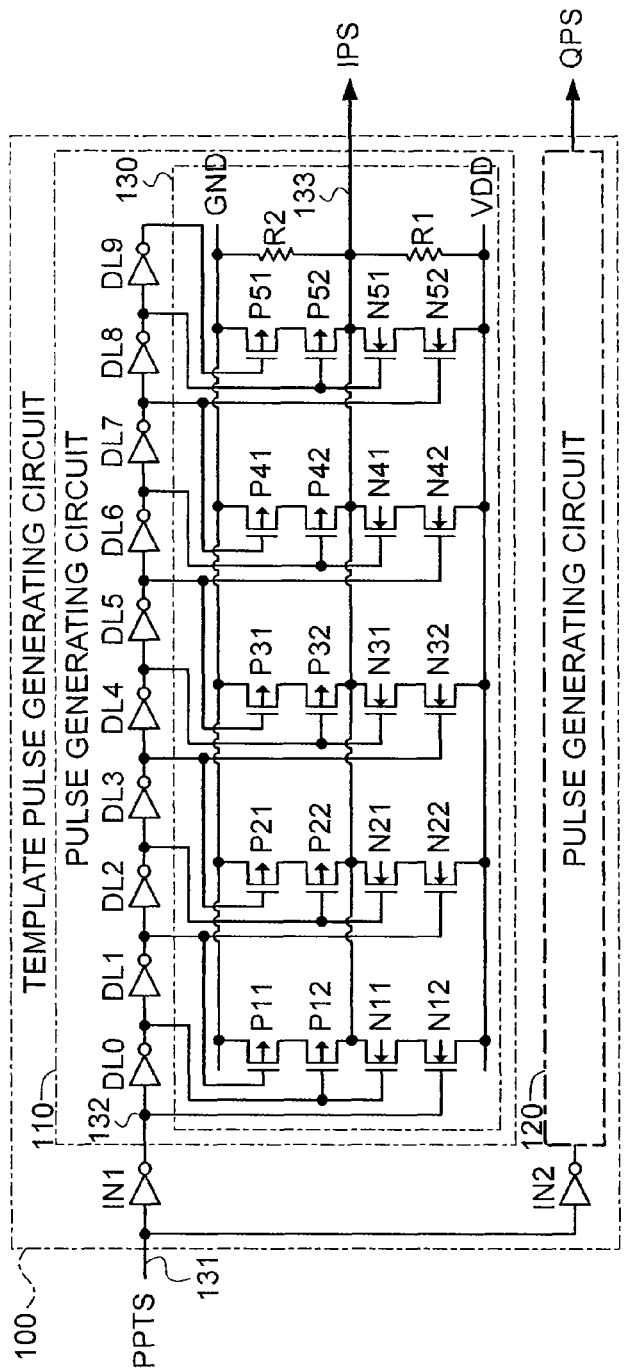
FIG. 6A is a circuit diagram showing a structure of a template pulse generating circuit.
Figure 6B:
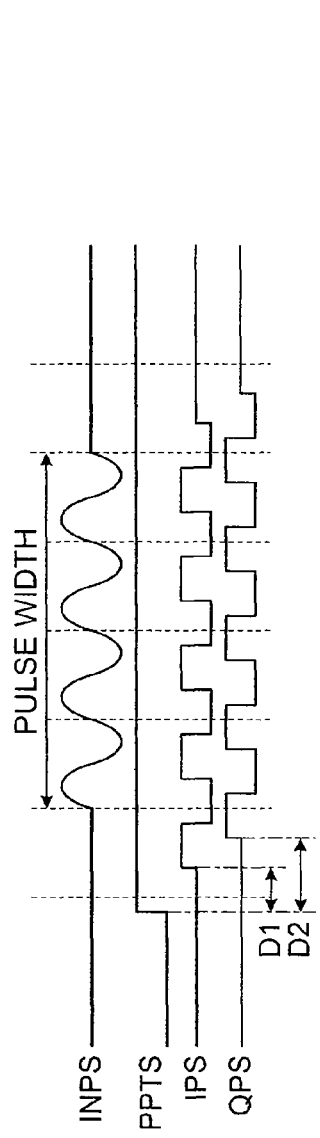
FIG. 6B is a timing chart showing operation of the template pulse generating circuit.

A structure of the template pulse generating circuit is now described with reference to FIGS. 6A and 6B. FIG. 6A is a circuit diagram showing the structure of the template pulse generating circuit. FIG. 6B is a timing chart showing operation of the template pulse generating circuit.

As illustrated in FIG. 6A, the template pulse generating circuit 100 includes an inverter IN1 as a first delay element, an inverter IN2 as a second delay element, a pulse generating circuit 110 as a first pulse generating circuit, and a pulse generating circuit 120 as a second pulse generating circuit.

The input pins of the inverters IN1 and IN2 are connected to a timing input pin 131 in parallel through which the pulse position timing signal PPTS is inputted. The output pin of the inverter IN1 is connected to a first pin 132 of the pulse generating circuit 110 to output the I-phase pulse signal IPS as the first pulse signal through a second pin 133. The output pin of the inverter IN2 is connected to the first pin 132 of the pulse generating circuit 120 to output the Q-phase pulse signal QPS as the second pulse signal through the second pin 133.

The pulse generating circuit 110 includes n=10 delay elements DL0 through DL9 connected in series to the output pin of the inverter IN1, and a logic circuit 130 for outputting the I-phase pulse signal IPS based on the output signal from the inverter IN1 and respective output signals outputted from the delay elements DL0 through DL9. The pulse generating circuit 120 is a circuit equivalent to the pulse generating circuit 110.

The logic circuit 130 includes Pch transistors P11 and P12, Nch transistors N11 and N12 connected in series between ground voltage GND and power supply voltage VDD, Pch transistors P21 and P22 and Nch transistors N21 and N22 connected in series between the ground voltage GND and the power supply voltage VDD, Pch transistors P31 and P32 and Nch transistors N31 and N32 connected in series between the ground voltage GND and the power supply voltage VDD, Pch transistors P41 and P42 and Nch transistors N41 and N42 connected in series between the ground voltage GND and the power supply voltage VDD, Pch transistors P51 and P52 and Nch transistors N51 and N52 connected in series between the ground voltage GND and the power supply voltage VDD, and resistance elements R2 and R1 connected in series between the ground voltage GND and the power supply voltage VDD.

The contact between the Pch transistor P12 and the Nch transistor N11, the contact between the Pch transistor P22 and the Nch transistor N21, the contact between the Pch transistor P32 and the Nch transistor N31, the contact between the Pch transistor P42 and the Nch transistor N41, the contact between the Pch transistor P52 and the Nch transistor N51, and the contact between the resistors R2 and R1 are connected in common to output the I-phase pulse signal IPS (or Q-phase pulse signal QPS).

The gate pin of the Pch transistor P11 is connected with the output pin of the delay element DL1. The gate pins of the Pch transistor P12 and the Nch transistor N11 are connected with the output pin of the delay element DL0. The gate pin of the Nch transistor N12 is connected with the output pin of the inverter IN1 (or inverter IN2).

The gate pin of the Pch transistor P21 is connected with the output pin of the delay element DL3. The gate pins of the Pch transistor P22 and the Nch transistor N21 are connected with the output pin of the delay element DL2. The gate pin of the Nch transistor N22 is connected with the output pin of the delay element DL1.

The gate pin of the Pch transistor P31 is connected with the output pin of the delay element DL5. The gate pins of the Pch transistor P32 and the Nch transistor N31 are connected with the output pin of the delay element DL4. The gate pin of the Nch transistor N32 is connected with the output pin of the delay element DL3.

The gate pin of the Pch transistor P41 is connected with the output pin of the delay element DL7. The gate pins of the Pch transistor P42 and the Nch transistor N41 are connected with the output pin of the delay element DL6. The gate pin of the Nch transistor N42 is connected with the output pin of the delay element DL5.

The gate pin of the Pch transistor P51 is connected with the output pin of the delay element DL9. The gate pins of the Pch transistor P52 and the Nch transistor N51 are connected with the output pin of the delay element DL8. The gate pin of the Nch transistor N52 is connected with the output pin of the delay element DL7.

As shown in FIG. 6B, a delay time D2 as a period from the rising of the pulse position timing signal PPTS of the inverter IN2 is longer than a delay time D1 as a period from the rising of the pulse position timing signal PPTS of the inverter IN1. The template pulse generating circuit 100 generates the I-phase pulse signal IPS and the Q-phase pulse signal QPS having the phase difference Φ of 90 degrees by controlling the delay time D1 of the inverter IN1 and the delay time D2 of the inverter IN2.

According to this embodiment, the following advantages are offered.

In this embodiment, detection can be executed with reduced effect of interference signals and with no need for providing clock source having high accuracy and low jitter by combining two pulse signals having difference phases. Thus, circuit scale and power consumption can be reduced. Particularly, envelope detection can be performed with the highest efficiency by combining the I-phase pulse signal IPS and the Q-phase pulse signal QPS whose phase difference is 90°.

While the pulse receiving circuit according to this embodiment has been described, the invention is not limited to this example. It is thus intended that various modifications and changes may be made without departing from the scope of the invention. For example, the following modifications may be made.

MODIFIED EXAMPLE 1

Figure 7A:
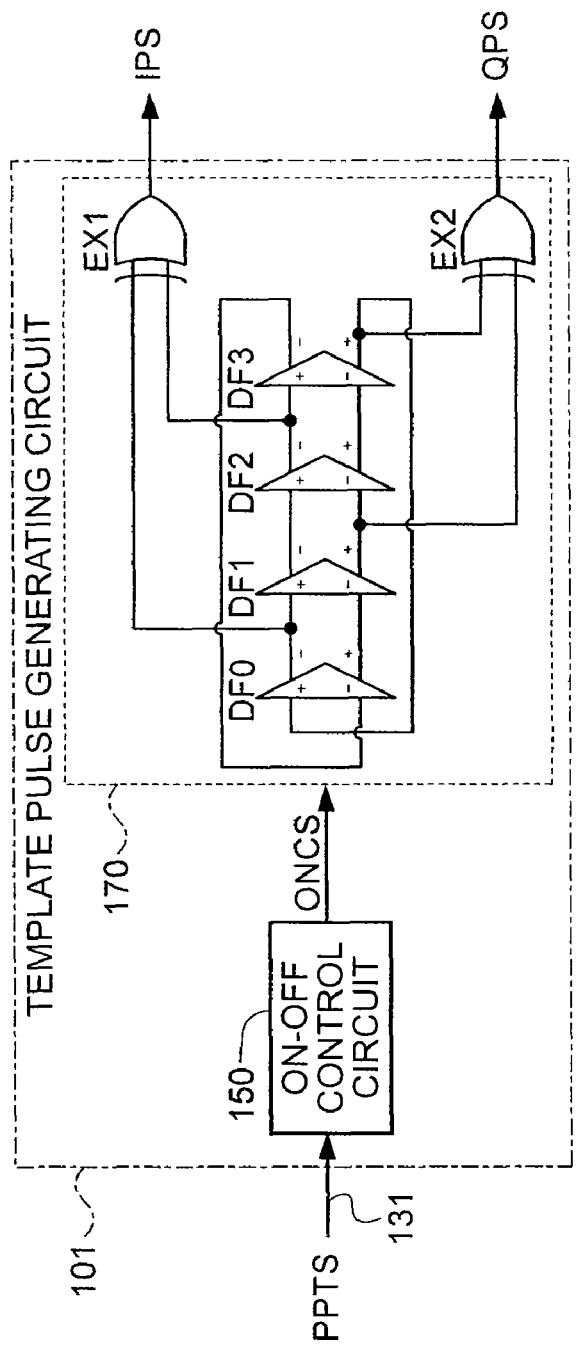
FIG. 7A is a circuit diagram showing a structure of a template pulse generating circuit according to a modified example 1.
Figure 7B:
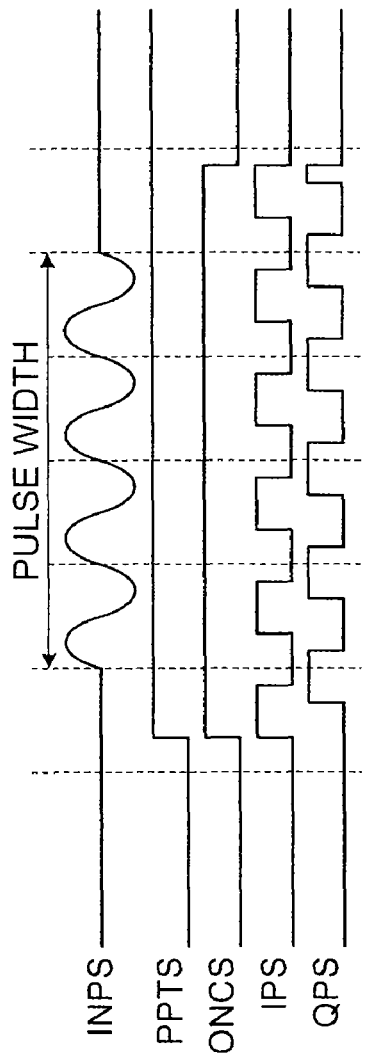
FIG. 7B is a timing chart showing operation of the template pulse generating circuit in the modified example 1.

A modified example 1 of the pulse receiving circuit is now described. FIG. 7A is a circuit diagram showing a structure of the template pulse generating circuit according to the modified example 1. FIG. 7B is a timing chart showing operation of the template pulse generating circuit in the modified example 1.

As illustrated in FIG. 7A, a template pulse generating circuit 101 in the modified example 1 includes a timing input pin 131 through which the pulse position timing signal PPTS is inputted, a multi-phase oscillating circuit 170 for generating the I-phase pulse signal IPS and the Q-phase pulse signal QPS, and an ON-OFF control circuit 150 connected between the timing input pin 131 and the multi-phase oscillating circuit 170 for outputting an ON-OFF control signal ONCS which is turned on when the pulse position timing signal PPTS is ON-state and turned off after elapse of a time period longer than the pulse width of the receiving signal INPS from the time when the ON-state is started as shown in FIG. 7B.

The multi-phase oscillating circuit 170 has four differential inverters DF0 through DF3 connected in series, and two exclusive OR circuits EX1 and EX2. One of the input pins of the exclusive OR circuit EX1 is connected with the minus output pin of the differential inverter DF0, and the other input pin of the exclusive OR circuit EX1 is connected with the minus output pin of the differential inverter DF2 so as to output the I-phase pulse signal IPS. One of the input pins of the exclusive OR circuit EX2 is connected with the plus output pin of the differential inverter DF1, and the other input pin of the exclusive OR circuit EX2 is connected with the plus output pin of the differential inverter DF3 so as to output the Q-phase pulse signal QPS. The plus output pin of the differential inverter DF3 is connected with the plus input pin of the differential inverter DF0, and the minus output pin of the differential inverter DF3 is connected with the minus input pin of the differential inverter DF0. The multi-phase oscillating circuit 170 oscillates while an ON-OFF control signal ONCS is turned on to output the I-phase pulse signal IPS and the Q-phase pulse signal QPS.

According to the template pulse generating circuit 101 in the modified example 1, the differential inverter needs to operate at a speed twice higher than that of the template pulse generating circuit 100 in the first embodiment shown in FIG. 6A. In this case, power consumption increases. However, the I-phase pulse signal IPS and the Q-phase pulse signal QPS having more accurate phase difference Φ of 90 degrees can be generated.

MODIFIED EXAMPLE 2

Figure 8:
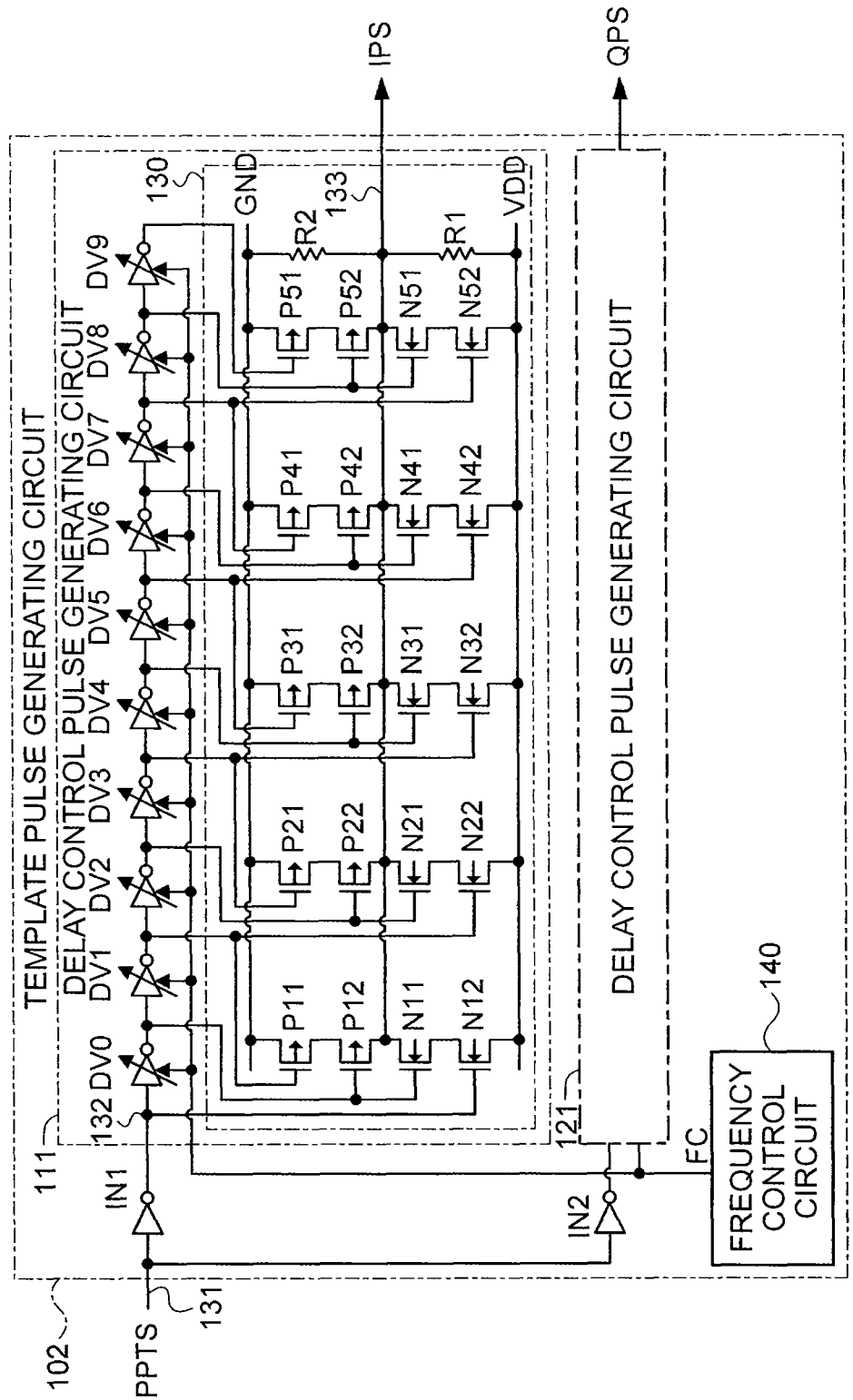
FIG. 8 is a circuit diagram showing a structure of a template pulse generating circuit according to a modified example 2.

A pulse receiving circuit according to a modified example 2 is now described. FIG. 8 is a circuit diagram showing the structure of the template pulse generating circuit according to the modified example 2.

As illustrated in FIG. 8, a template pulse generating circuit 102 in the modified example 2 includes a delay control pulse generating circuit 111 as a first frequency control pulse generating circuit and a delay control pulse generating circuit 121 as a second frequency control pulse generating circuit each of which has delay control elements DV0 through DV9 capable of controlling delay time based on a frequency control signal FC instead of the delay elements DL0 through DL9 of the template pulse generating circuit 100 in the first embodiment shown in FIG. 6A, and a frequency control circuit 140 for generating the frequency control signal FC.

According to the template pulse generating circuit 102 in the modified example 2, frequency control can be achieved by the simple frequency control circuit 140.

MODIFIED EXAMPLE 3

Figure 9:
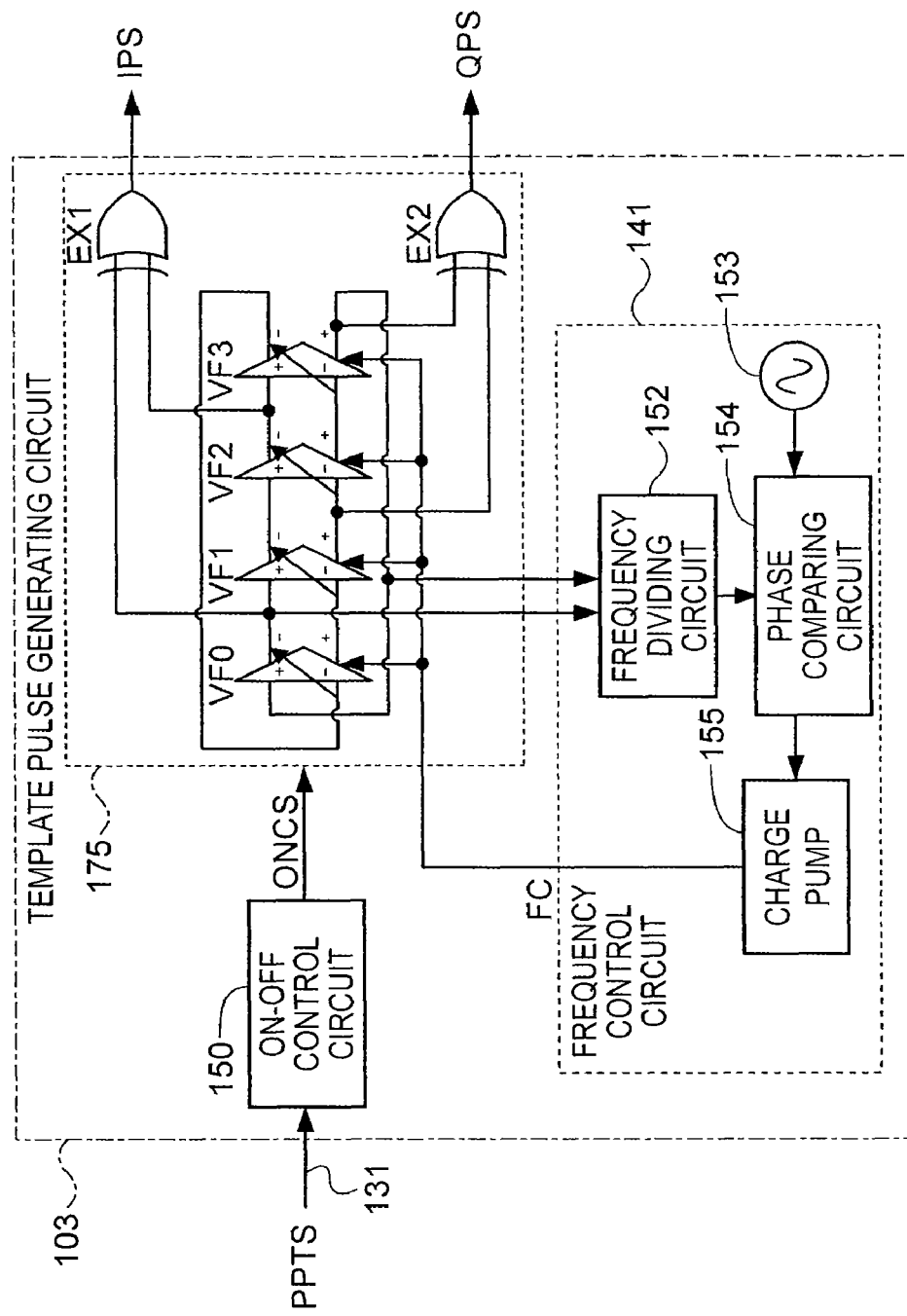
FIG. 9 is a circuit diagram showing a structure of a template pulse generating circuit according to a modified example 3.

A pulse receiving circuit according to a modified example 3 is now described. FIG. 9 is a circuit diagram showing the structure of the template pulse generating circuit according to the modified example 3.

As illustrated in FIG. 9, a template pulse generating circuit 103 includes a frequency control multi-phase oscillating circuit 175 which has delay control differential inverters VF0 through VF3 capable of controlling delay time based on the frequency control signal FC instead of the differential inverters DF0 through DF3 of the template pulse generating circuit 101 in the modified example 1 shown in FIG. 7A, and a frequency control circuit 141 for generating the frequency control signal FC. The frequency control circuit 141 has a frequency dividing circuit 152 connected with the minus output pin of the delay control differential inverter VF0 and the plus output pin of the delay control differential inverter VF3, a phase comparing circuit 154 for comparing the phases of the output from the dividing circuit 152 and the output from a reference clock 153, and a charge pump 155 for generating the frequency control signal FC based on the output from the phase comparing circuit 154.

According to the template pulse generating circuit 102 in the modified example 3, the frequency control signal FC can be controlled based on an oscillation signal from the frequency control multi-phase oscillating circuit 175. Thus, accurate frequency control can be achieved.

MODIFIED EXAMPLE 4

Figure 10:
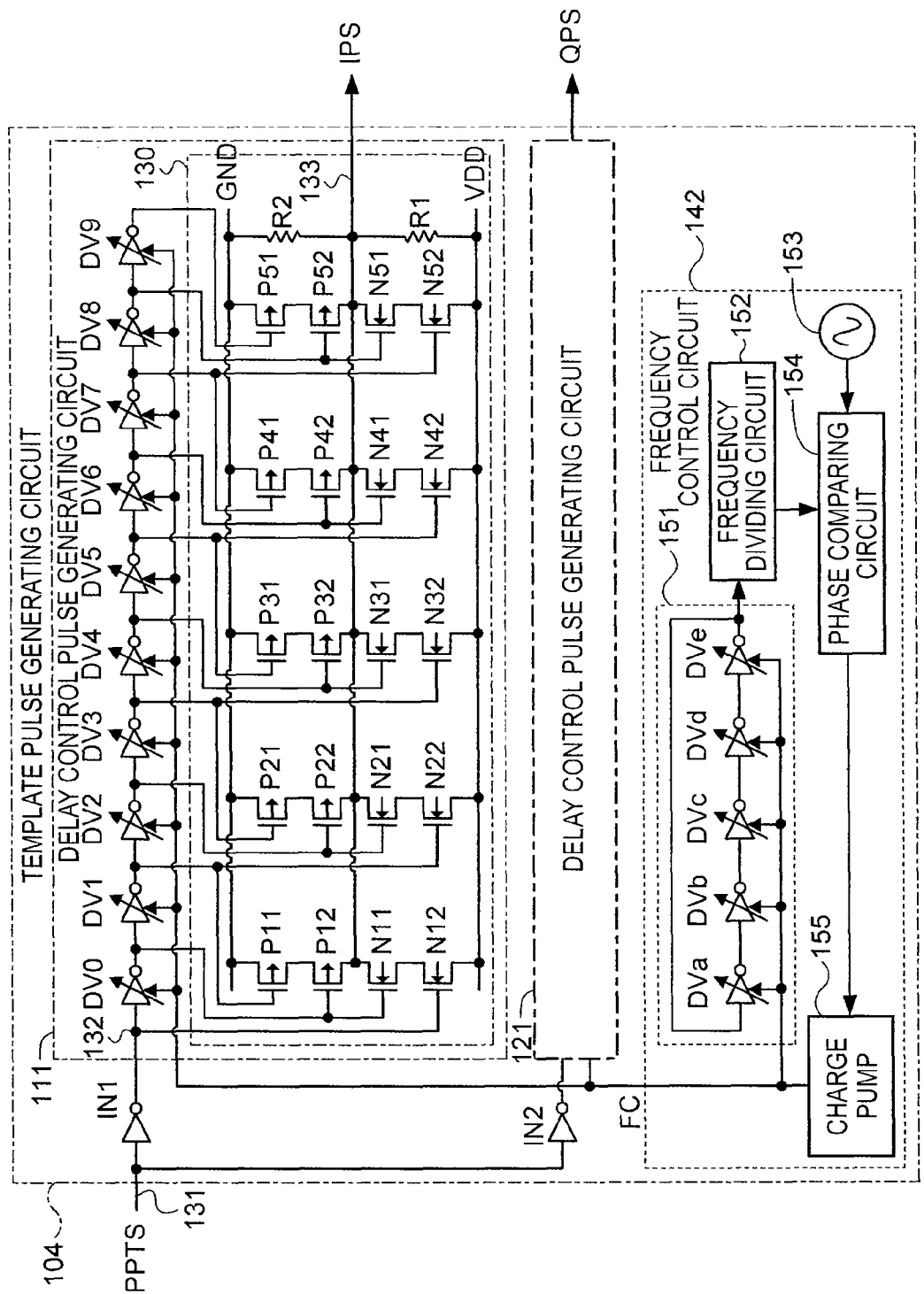
FIG. 10 is a circuit diagram showing a structure of a template pulse generating circuit according to a modified example 4.

A pulse receiving circuit according to a modified example 4 is now described. FIG. 10 is a circuit diagram showing the structure of the template pulse generating circuit according to the modified example 4.

As illustrated in FIG. 10, a frequency control circuit 142 of a template pulse generating circuit 104 in the modified example 4 contains a ring oscillating circuit 151 which includes m=5 delay control elements DVa through DVe having delay characteristics approximately equivalent or proportional to those of the delay control elements DV0 through DV9 included in the delay control pulse generating circuits 111 and 121 as the frequency control circuit 140 of the template pulse generating circuit 102 in the modified example 2 shown in FIG. 8, the frequency dividing circuit 152 connected with the output pin of the ring oscillating circuit 151, the phase comparing circuit 154 for comparing the phases of the output from the frequency dividing circuit 152 and the reference clock 153, and the charge pump 155 for generating the frequency control signal FC based on the output from the phase comparing circuit 154.

According to the template pulse generating circuit 104 in the modified example 4, the frequency control signal FC is controlled based on the oscillation cycle of the ring oscillating circuit 151 which includes the delay control elements DVa through DVe having delay characteristics approximately equivalent or proportional to those of the delay control elements DV0 through DV9 included in the first frequency control pulse generating circuit 111 and the second frequency control pulse generating circuit 121. Thus, almost accurate frequency control can be achieved without direct observation of the pulse signals IPS and QPS having high frequency.

MODIFIED EXAMPLE 5

Figure 11:
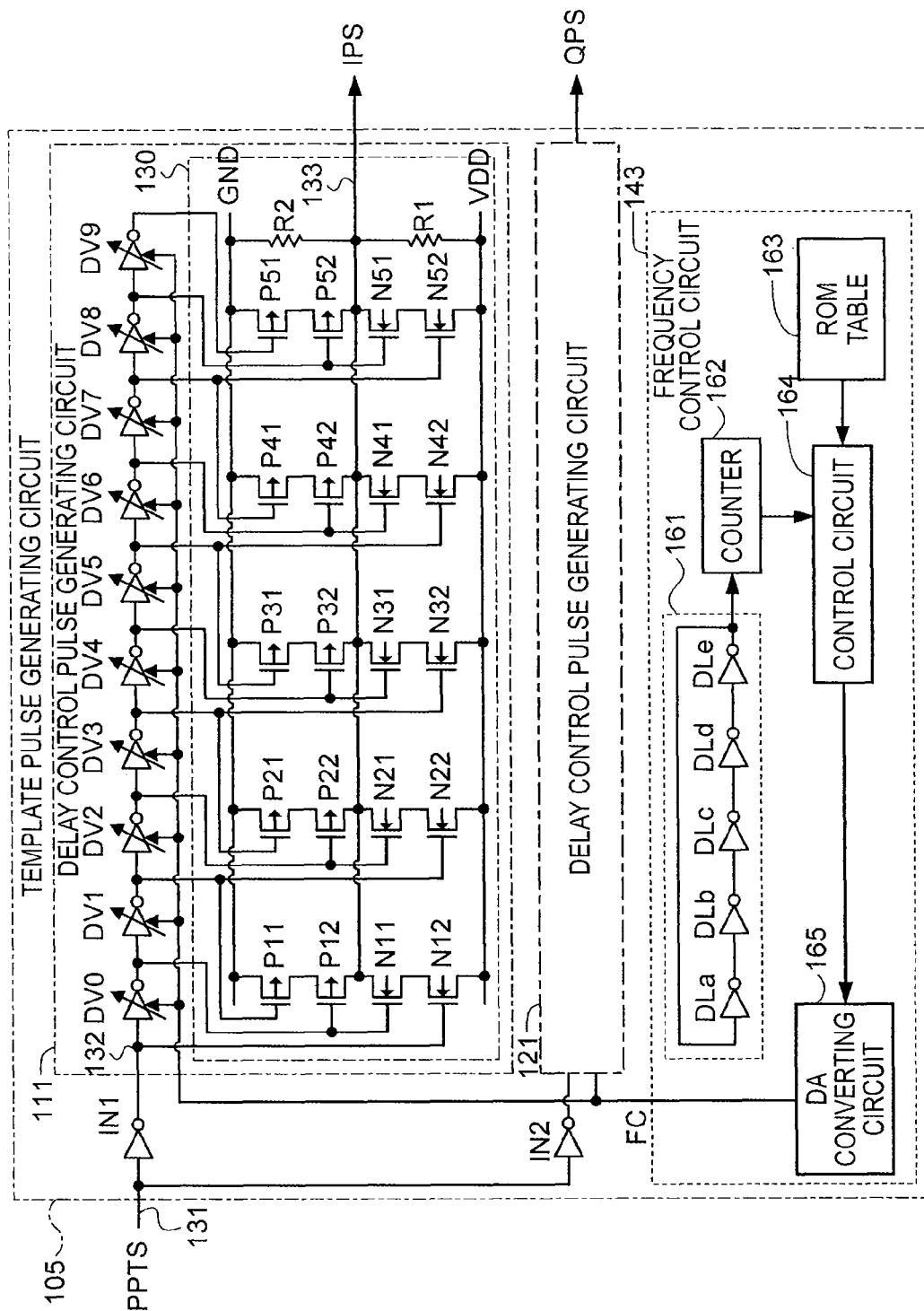
FIG. 11 is a circuit diagram showing a structure of a template pulse generating circuit according to a modified example 5.

A pulse receiving circuit according to a modified example 5 is now described. FIG. 11 is a circuit diagram showing the structure of the template pulse generating circuit according to the modified example 5.

As illustrated in FIG. 11, a template pulse generating circuit 105 in the modified example 5 employs a frequency control circuit 143 which contains a ring oscillating circuit 161 which includes m=5 delay elements DLa through DLe having delay characteristics approximately equivalent or proportional to those of the delay elements included in the template pulse generating circuit 102 in the modified example 2 shown in FIG. 8 as the frequency control circuit 140 of the template pulse generating circuit 102 in the modified example 2 shown in FIG. 8, a counter circuit 162 connected with the output pin of the ring oscillating circuit 161, a control circuit 164 for obtaining the digital value of the frequency control signal FC corresponding to the count value of the counter circuit 162 based on a ROM table 163, and a DA converting circuit 165 for converting the digital value of the control circuit 164 into the frequency control signal FC.

According to the template pulse generating circuit 105 in the modified example 5, frequency is controlled by referring to the ROM table 163 corresponding to the count value of the ring oscillating circuit 161. Thus, increase in the frequency control speed, simplification of the circuit, and power consumption reduction can be achieved.

MODIFIED EXAMPLE 6

Figure 12:
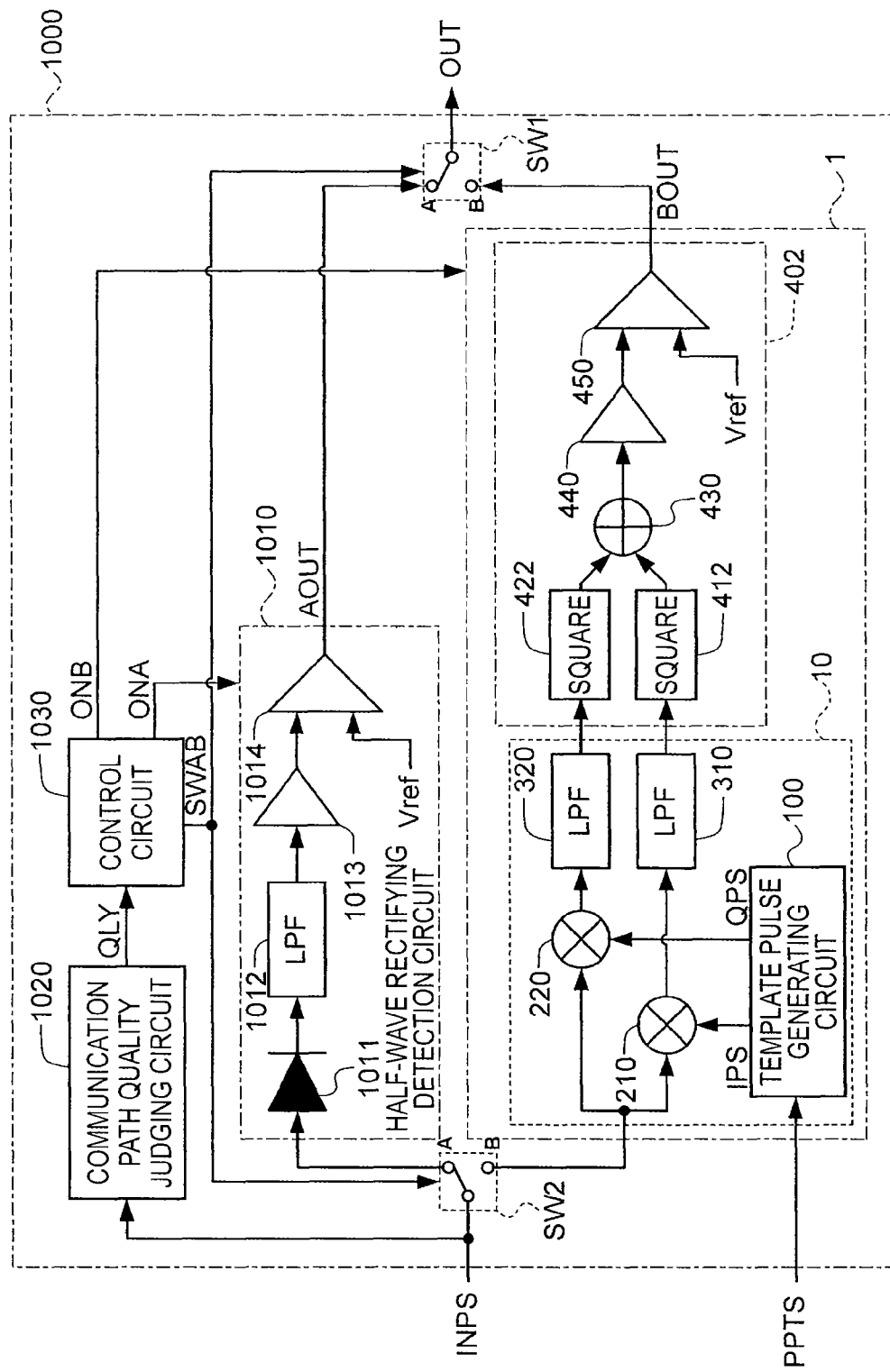
FIG. 12 is a circuit diagram showing a structure of a template pulse generating circuit according to a modified example 6.

A pulse receiving circuit according to a modified example 6 is now described. FIG. 12 is a circuit diagram showing the structure of the template pulse generating circuit according to the modified example 6.

As illustrated in FIG. 12, a pulse receiving circuit 1000 in the modified example 6 includes the pulse receiving circuit 1 in the first embodiment, a receiving circuit 1010 having a half-wave rectifying detection circuit, a communication path quality judging circuit 1020 for judging communication path quality QLY based on a receiving signal INPS, a control circuit 1030, and switch circuits SW1 and SW2. The control circuit 1030 outputs a switch signal SWAB for changing the switch circuits SW1 and SW2 to B-side and an ON signal ONB for activating the pulse receiving circuit 1 when the communication path quality QLY is lower than a predetermined quality. Also, the control circuit 1030 outputs a switch signal SWAB for changing the switch circuits SW1 and SW2 to A-side and an ON signal ONA for activating the pulse receiving circuit 1010 when the communication path quality QLY is higher than the predetermined quality.

According to the pulse receiving circuit 1000 in the modified example 6, the receiving circuit 1010 having a small circuit structure is selected when the communication path quality is preferable. Thus, power consumption can be reduced. The receiving circuit 1010 may be constituted by a full-wave rectifying detection circuit, or by a square detection circuit. For judging the communication path quality, signal level of only expected interference waves extracted by band pass filter may be measured, or receiving signal level at a time other than that of the desired receiving pulse position may be measured, for example. While the communication path quality has been judged based on the receiving signal in this modified example, the communication path quality may be judged based on a detection signal. In this case, BER, PER (packet error rate), or other elements may be used.

MODIFIED EXAMPLE 7

Figure 13:
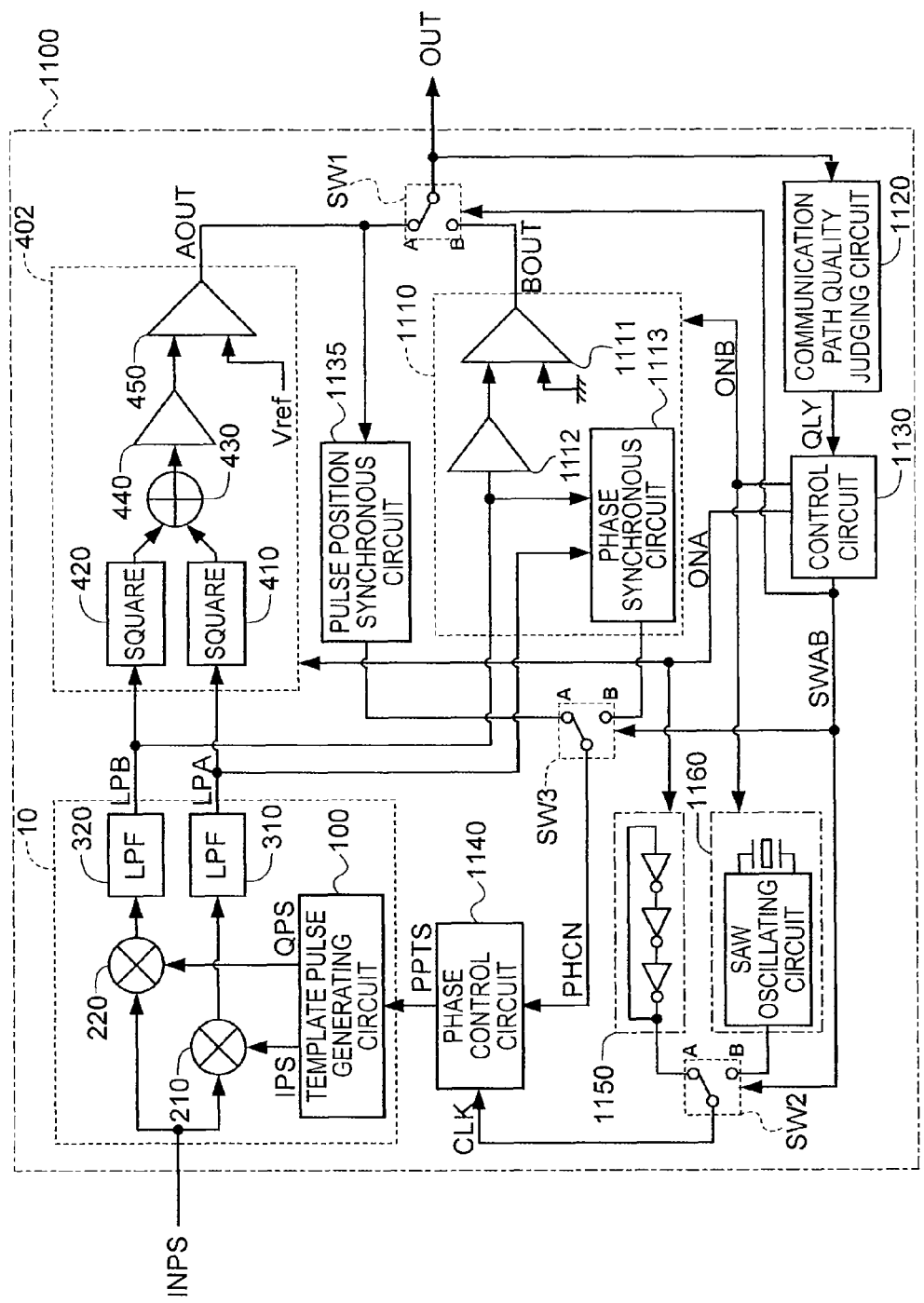
FIG. 13 is a circuit diagram showing a structure of a template pulse generating circuit according to a modified example 7.

A pulse receiving circuit according to a modified example 7 is now described. FIG. 13 is a circuit diagram showing the structure of the template pulse generating circuit according to the modified example 7.

As illustrated in FIG. 13, a pulse receiving circuit 1100 in the modified example 7 includes a signal processing circuit 10, an envelope detection circuit 402, a synchronous detection circuit 1110 containing a phase synchronous circuit 1113, a communication path quality judging circuit 1120 for judging the communication path quality QLY based on the detection signal OUT, a control circuit 1130, a pulse position synchronous circuit 1135, a phase control circuit 1140, switch circuits SW1, SW2 and SW3, a ring oscillating circuit 1150, and an SAW oscillating circuit 1160 as a resonance oscillator. The control circuit 1130 outputs the switch signal SWAB for changing the switch circuits SW1, SW2 and SW3 to A-side and the ON signal ONA for activating the envelope detection circuit 402 and the ring oscillating circuit 1150 when the communication path quality QLY is higher than a predetermined quality. Also, the control circuit 1130 outputs the switch signal SWAB for changing the switch circuits SW1, SW2 and SW3 to B-side and the ON signal ONB for activating the synchronous detection circuit 1110 and the SAW oscillating circuit 1160 when the communication path quality QLY is lower than the predetermined quality.

According to the pulse receiving circuit 1100 in the modified example 7, the synchronous detection circuit 1110 having high performance and the low-jitter SAW oscillating circuit 1160 are selected when the communication path quality is low due to presence of interference signals or the like. Thus, both increase in resistance to interference signals and reduction of power consumption can be achieved. The resonance oscillator may be constituted by crystal oscillator, FBAR oscillator, LC oscillator, or others.

While two levels of higher and lower than the predetermined quality are used for judgment of the communication path quality QLY in the modified example 7, three levels of high, medium, and low may be employed. In this case, the envelope detection circuit is connected at the time of high level, the pulse receiving circuit 1 in the first embodiment is connected at the time of medium level, and the synchronous detection circuit is connected at the time of low level. According to this structure, the optimum pulse receiving circuit is selected according to the communication path quality. Thus, both increase in resistance to interference signals and reduction of power consumption can be achieved.

MODIFIED EXAMPLE 8

Figure 14:
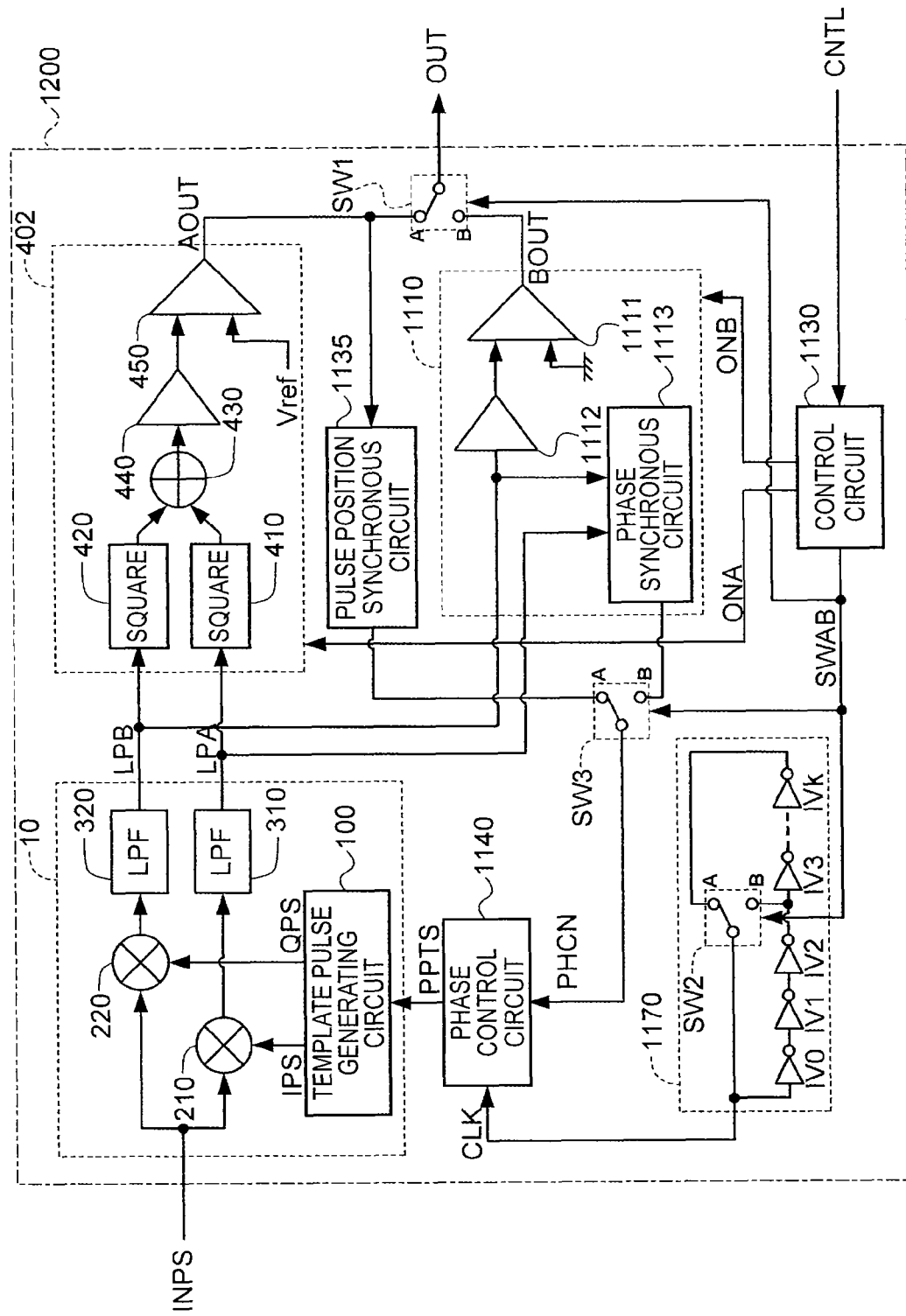
FIG. 14 is a circuit diagram showing a structure of a template pulse generating circuit according to a modified example 8.

A pulse receiving circuit according to a modified example 8 is now described. FIG. 14 is a circuit diagram showing the structure of the template pulse generating circuit according to the modified example 8.

As illustrated in FIG. 14, a pulse receiving circuit 1200 in the modified example 8 includes a variable ring oscillating circuit 1170 capable of changing the numbers of the delay elements contained in the ring oscillating circuit 1150 and the SAW oscillating circuit 1160 of the pulse receiving circuit 1100 in the modified example 7 between two numbers (p and p+q). The pulse receiving circuit 1200 is controlled by a control signal CNTL from the outside.

According to the pulse receiving circuit 1200 in the modified example 8, the optimum communication speed is selected according to variations in the amount of the transmission data. When the communication speed is high (generation of transmission signals is frequent), the synchronous detection circuit having high resistance to interference is selected. Thus, improvement in resistance to interference and reduction of power consumption can be achieved. In case of high communication speed, relative resistance to interference decreases due to reduction of energy per one pulse required for legal regulation or power consumption limitation. However, this decrease can be compensated by switching to the synchronous detection circuit. When the communication speed is low (generation of transmission signals is infrequent), the variable ring oscillating circuit 1170 needs to increase the number of the inverters as the delay elements. In this case, jitters produced from the respective inverters are combined, and thus the instantaneous jitter of the output from the ring oscillator is large. When the communication speed is high, the number of the inverters as the delay elements can be decreased. In this case, the instantaneous jitter of the output from the variable ring oscillating circuit 1170 is small, and thus synchronous detection can be performed.

MODIFIED EXAMPLE 9

Figure 15:
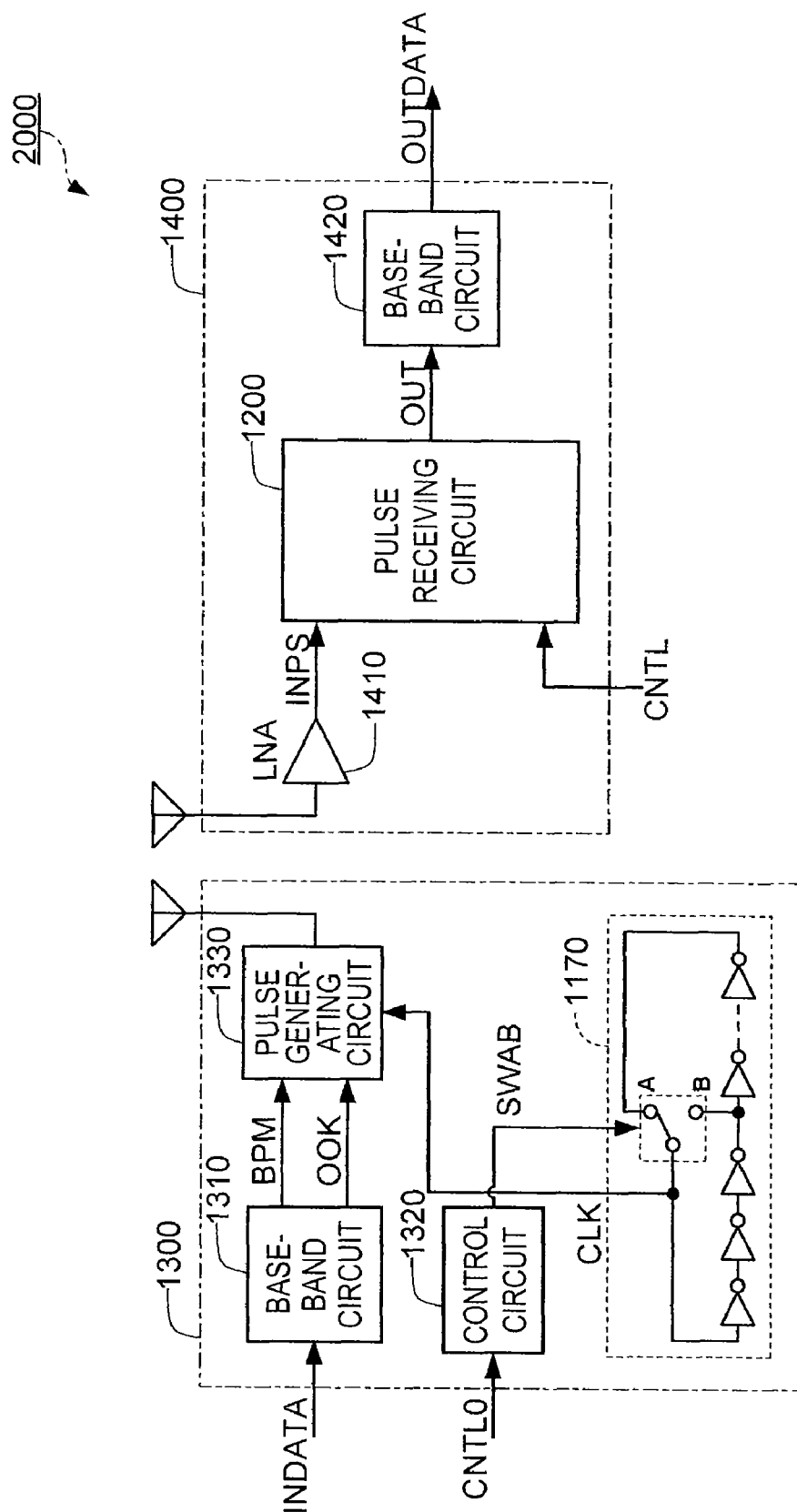
FIG. 15 is a circuit diagram showing a structure of a pulse wireless communication device.

A pulse receiving circuit according to a modified example 9 is now described. FIG. 15 is a circuit diagram showing a structure of a pulse wireless communication device including the pulse receiving circuit 1200 according to the modified example 8.

As illustrated in FIG. 15, a pulse wireless communication device 2000 includes a transmitting circuit 1300 and a receiving circuit 1400. The receiving circuit 1400 has the pulse receiving circuit 1200 in the modified example 8, and the transmitting circuit 1300 has the variable ring oscillating circuit 1170 contained in the pulse receiving circuit 1200.

According to the pulse wireless communication device 2000 in the modified example 9, communication not easily affected by interference signals can be provided without requiring high-accuracy and low-jitter clock source while reducing circuit scale and power consumption.

MODIFIED EXAMPLE 10

Figure 16:
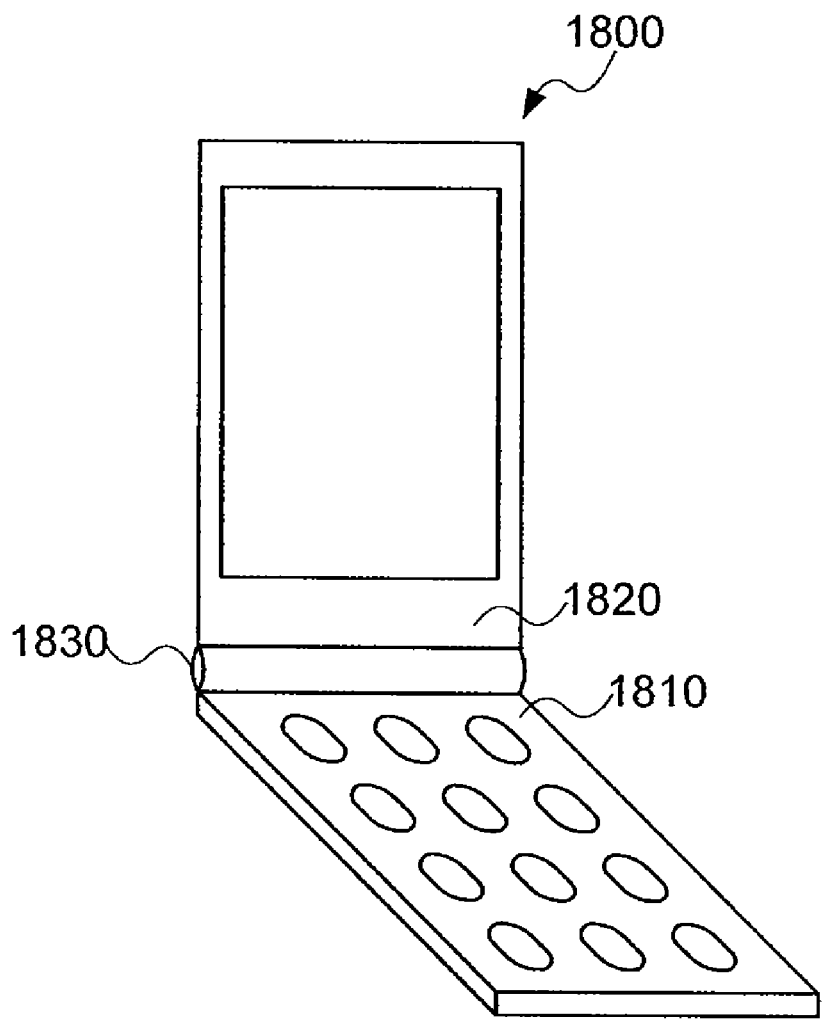
FIG. 16 schematically illustrates a structure of a cellular phone.

An example of an electronic device including a pulse wireless communication device is now described. FIG. 16 schematically illustrates a structure of a cellular phone as an electronic device including the pulse wireless communication device in the modified example 9. A cellular phone 1800 includes a main body 1810 having operation buttons and the like, and a display unit 1820 having a liquid crystal panel and the like connected with the main body 1810 via a hinge unit 1830 such that the main body 1810 and the display unit 1820 can be folded. The main body 1810 contains the transmitting circuit 1300 shown in FIG. 15, and the display unit 1820 contains the receiving circuit 1400 shown in FIG. 15, so that data such as dynamic images, still images, and audio data can be transmitted from the main body 1810 to the display unit 1820 by wireless communication. According to the cellular phone 1800 containing the transmitting circuit 1300 and the receiving circuit 1400, data such as dynamic images, still images, and audio data can be transmitted at high speed from the main body 1810 to the display unit 1820.

The entire disclosure of Japanese Patent Application No. 2007-213365, filed Aug. 20, 2007 is expressly incorporated by reference herein.

What is claimed is:

1. A pulse receiving circuit which receives a receiving signal from the outside, comprising:
    a template pulse generating circuit which generates a first pulse signal and a second pulse signal having phase different from that of the first pulse signal based on a pulse position timing signal;
    a first multiplying circuit which multiplies the receiving signal by the first pulse signal and outputs a first multiplication signal;
    a second multiplying circuit which multiplies the receiving signal by the second pulse signal and outputs a second multiplication signal;
    a first low band pass filtering circuit which extracts low frequency component from frequency components of the first multiplication signal and outputs a first low frequency signal;
    a second low band pass filtering circuit which extracts low frequency component from frequency components of the second multiplication signal and outputs a second low frequency signal; and
    an envelope detection circuit which performs envelope calculation by using the first low frequency signal and the second low frequency signal and outputs a detection signal.

2. The pulse receiving circuit according to claim 1, wherein the phase difference between the first pulse signal and the second pulse signal is approximately 90 degrees.

3. The pulse receiving circuit according to claim 1, wherein the envelope detection circuit contains a half-wave rectifying circuit.

4. The pulse receiving circuit according to claim 1, wherein the envelope detection circuit contains a full-wave rectifying circuit.

5. The pulse receiving circuit according to claim 1, wherein the envelope detection circuit contains a square circuit.

6. The pulse receiving circuit according to claim 1, wherein the template pulse generating circuit includes:
    a first pulse generating circuit and a second pulse generating circuit, each of which contains a first pin, a second pin, n (n: two or larger integer) delay elements connected in series with the first pin, and a logic circuit outputting a pulse signal through the second pin based on a signal inputted through the first pin and n output signals outputted from the n delay elements;
    a timing input pin through which the pulse position timing signal is inputted;
    a first delay element; and
    a second delay element having longer delay time than that of the first delay element,
    the input pins of the first delay element and second delay element being connected with the timing input pin,
    the output pin of the first delay element being connected with the first pin of the first pulse generating circuit to output the first pulse signal through the second pin of the first pulse generating circuit, and
    the output pin of the second delay element being connected with the first pin of the second pulse generating circuit to output the second pulse signal through the second pin of the second pulse generating circuit.

7. The pulse receiving circuit according to claim 1, wherein the template pulse generating circuit includes:
    a timing input pin through which the pulse position timing signal is inputted;
    a multi-phase oscillating circuit which generates the first pulse signal and the second pulse signal; and
    an ON-OFF control circuit connected between the input pin and the multi-phase oscillating circuit to output an ON-OFF signal which is turned on when the pulse position timing signal is turned on, and turned off after a time period longer than a pulse width of the receiving signal elapses from the time when the ON-OFF signal is turned on,
    the multi-phase oscillating circuit generating the first pulse signal and the second pulse signal based on the ON-OFF control signal.

8. The pulse receiving circuit according to claim 1, wherein the template pulse generating circuit includes:
    a first frequency control pulse generating circuit and a second frequency control pulse generating circuit, each of which contains a first pin, a second pin, n (n: two or larger integer) delay control elements connected in series with the first pin and capable of controlling delay time based on a frequency control signal, and a logic circuit outputting a pulse signal through the second pin based on a signal inputted through the first pin and n output signals outputted from the n delay elements;
    a timing input pin through which the pulse position timing signal is inputted;
    a first delay element;
    a second delay element having longer delay time than that of the first delay element; and
    a frequency control circuit which outputs the frequency control signal,
    input pins of the first delay element and the second delay element being connected with the timing input pin,
    the output pin of the first delay element being connected with the first pin of the first frequency control pulse generating circuit to output the first pulse signal through the second pin of the first frequency control pulse generating circuit, and
    the output pin of the second delay element being connected with the first pin of the second frequency control pulse generating circuit to output the second pulse signal through the second pin of the second frequency control pulse generating circuit.

9. The pulse receiving circuit according to claim 1, wherein the template pulse generating circuit includes:
    a timing input pin through which the pulse position timing signal is inputted;
    a frequency control multi-phase oscillating circuit which controls frequency of an oscillation signal based on a frequency control signal for generating the first pulse signal and the second pulse signal;

an ON-OFF control circuit connected between the input pin and the frequency control multi-phase oscillating circuit to output an ON-OFF signal which is turned on when the pulse position timing signal is turned on, and turned off after a time period longer than a pulse width of the receiving signal elapses from the time when the ON-OFF signal is turned on; and a frequency control circuit which generates the frequency control signal based on the oscillation signal.

10. The pulse receiving circuit according to claim 1, wherein the template pulse generating circuit includes:

a first frequency control pulse generating circuit and a second frequency control pulse generating circuit, each of which contains a first pin, a second pin, n (n: two or larger integer) delay control elements connected in series with the first pin and capable of controlling delay time based on a frequency control signal, and a logic circuit outputting a pulse signal through the second pin based on a signal inputted through the first pin and n output signals outputted from the n delay elements;

a frequency control circuit which contains a ring oscillating circuit having m (m: 2 or larger integer) delay control elements having delay characteristics substantially equivalent or proportional to those of the delay control elements and outputs the frequency control signal based on an output signal from the ring oscillating circuit;

a timing input pin through which the pulse position timing signal is inputted;

a first delay element;

a second delay element having longer delay time than that of the first delay element; and input pins of the first delay element and the second delay element being connected with the timing input pin, the output pin of the first delay element being connected with the first pin of the first frequency control pulse generating circuit to output the first pulse signal through the second pin of the first frequency control pulse generating circuit, and the output pin of the second delay element being connected with the first pin of the second frequency control pulse generating circuit to output the second pulse signal through the second pin of the second frequency control pulse generating circuit.

11. The pulse receiving circuit according to claim 1, wherein the template pulse generating circuit includes:

a first frequency control pulse generating circuit and a second frequency control pulse generating circuit, each of which contains a first pin, a second pin, n (n: two or larger integer) delay control elements connected in series with the first pin and capable of controlling delay time based on a frequency control signal, and a logic circuit outputting a pulse signal through the second pin based on a signal inputted through the first pin and n output signals outputted from the n delay elements;

a frequency control circuit which contains a ring oscillating circuit having m (m: 2 or larger integer) delay elements having delay characteristics substantially equivalent or proportional to those of the delay control elements, a counter circuit which counts an output signal from the ring oscillating circuit and outputs a count value, and a ROM table which stores the value of the frequency control signal corresponding to the count value;

a timing input pin through which the pulse position timing signal is inputted;

a first delay element;

a second delay element having longer delay time than that of the first delay element; and input pins of the first delay element and the second delay element being connected with the timing input pin, the output pin of the first delay element being connected with the first pin of the first frequency control pulse generating circuit to output the first pulse signal through the second pin of the first frequency control pulse generating circuit, and the output pin of the second delay element being connected with the first pin of the second frequency control pulse generating circuit to output the second pulse signal through the second pin of the second frequency control pulse generating circuit.

12. A pulse receiving circuit, comprising:

a first pulse receiving circuit which contains the pulse receiving circuit according to claim 1;

a second pulse receiving circuit which contains a half-wave rectifying detection circuit; and a communication path quality judging circuit which judges quality of a communication path;

wherein the receiving signal is inputted to the first pulse receiving circuit to output the detection signal when the quality of the communication path is lower than predetermined quality, and the receiving signal is inputted to the second pulse receiving circuit to output the detection signal when the quality of the communication path is higher than the predetermined quality.

13. A pulse receiving circuit, comprising:

a first pulse receiving circuit which contains the pulse receiving circuit according to claim 1;

a second pulse receiving circuit which contains a full-wave rectifying detection circuit; and a communication path quality judging circuit which judges quality of a communication path, wherein the receiving signal is inputted to the first pulse receiving circuit to output the detection signal when the quality of the communication path is lower than predetermined quality, and the receiving signal is inputted to the second pulse receiving circuit to output the detection signal when the quality of the communication path is higher than the predetermined quality.

14. A pulse receiving circuit, comprising:

a first pulse receiving circuit which contains the pulse receiving circuit according to claim 1;

a second pulse receiving circuit which contains a square detection circuit; and a communication path quality judging circuit which judges quality of a communication path, wherein the receiving signal is inputted to the first pulse receiving circuit to output the detection signal from the first pulse receiving circuit when the quality of the communication path is lower than predetermined quality, and the receiving signal is inputted to the second pulse receiving circuit to output the detection signal from the second pulse receiving circuit when the quality of the communication path is higher than the predetermined quality.

15. A pulse receiving circuit, comprising:

a first pulse receiving circuit which contains the pulse receiving circuit according to claim 1;

a second pulse receiving circuit which contains a synchronous detection circuit; and
a communication path quality judging circuit which judges quality of a communication path,
wherein
the receiving signal is inputted to the second pulse receiving circuit to output the detection signal from the second pulse receiving circuit when the quality of the communication path is lower than predetermined quality, and
the receiving signal is inputted to the first pulse receiving circuit to output the detection signal from the first pulse receiving circuit when the quality of the communication path is higher than the predetermined quality.

16. A pulse receiving circuit, comprising:
a first pulse receiving circuit which contains the pulse receiving circuit according to claim 1;
a second pulse receiving circuit which contains a synchronous detection circuit;
a communication path quality judging circuit which judges quality of a communication path; and
a phase control circuit which outputs the pulse position timing signal based on a clock signal,
wherein
the clock signal is produced by a resonance oscillator and the receiving signal is inputted to the second pulse receiving circuit to output the detection signal from the second pulse receiving circuit when the quality of the communication path is lower than predetermined quality, and
the clock signal is produced by a ring oscillator and the receiving signal is inputted to the first pulse receiving circuit to output the detection signal from the first pulse receiving circuit when the quality of the communication path is higher than the predetermined quality.

17. A pulse receiving circuit, comprising:
a first pulse receiving circuit which contains the pulse receiving circuit according to claim 1;
a second pulse receiving circuit which contains a synchronous detection circuit;
a third pulse receiving circuit as an envelope detection circuit; and
a communication path quality judging circuit which judges quality of a communication path,
wherein
the receiving signal is inputted to the second pulse receiving circuit to output the detection signal from the second pulse receiving circuit when the quality of the communication path is lower than first quality as predetermined quality,
the receiving signal is inputted to the first pulse receiving circuit to output the detection signal from the first pulse receiving circuit when the quality of the communication path lies within the range between the first quality and second quality higher than the first quality, and
the receiving signal is inputted to the third pulse receiving circuit to output the detection signal from the third pulse receiving circuit when the quality of the communication path is higher than the second quality.

18. A pulse receiving circuit, comprising:
a first pulse receiving circuit which contains the pulse receiving circuit according to claim 1;
a second pulse receiving circuit which contains a synchronous detection circuit;
a variable ring oscillating circuit which has p+q (p,q: arbitrary natural numbers) delay elements and switches between ring oscillation using the p delay elements and ring oscillation using the p+q delay elements; and
a phase control circuit which outputs the pulse position timing signal based on a clock signal,
wherein
the ring oscillation of the variable ring oscillating circuit using the p delay elements is selected and the receiving signal is inputted to the second pulse receiving circuit to output the detection signal from the second pulse receiving circuit when generation of the receiving signal is more frequent than a predetermined value, and
the ring oscillation of the variable ring oscillating circuit using the p+q delay elements is selected and the receiving signal is inputted to the first pulse receiving circuit to output the detection signal from the first pulse receiving circuit when generation of the receiving signal is more frequent than a predetermined value.

19. A pulse wireless communication device includes:
the pulse receiving circuit according to claim 1; and
a pulse transmitting circuit.

20. A pulse receiving method of receiving a signal from the outside comprising:
generating a first pulse signal based on a pulse position timing signal;
multiplying the receiving signal by the first pulse signal;
outputting a first multiplication signal;
extracting low frequency component from frequency components of the first multiplication signal;
outputting a first low frequency signal;
generating a second pulse signal having phase different from that of the first pulse signal based on the pulse position timing signal;
multiplying the receiving signal by the second pulse signal;
outputting a second multiplication signal;
extracting low frequency component from frequency components of the second multiplication signal;
outputting a second low frequency signal;
performing envelope calculation by using the first low frequency signal and the second low frequency signal; and
outputting a detection signal based on the result of envelope calculation.

* * * * *